US011094960B2

(12) United States Patent
Kim et al.

(10) Patent No.: US 11,094,960 B2
(45) Date of Patent: Aug. 17, 2021

(54) SECONDARY BATTERY AND MANUFACTURING METHOD THEREOF

(71) Applicant: Samsung SDI Co., Ltd., Yongin-si (KR)

(72) Inventors: Ki Jun Kim, Yongin-si (KR); Hei Chan An, Yongin-si (KR); Hyun Seok Jeong, Yongin-si (KR); Seong Jin Jo, Yongin-si (KR); Sang Hyun Kim, Yongin-si (KR); Seung Chan Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 146 days.

(21) Appl. No.: 16/219,673

(22) Filed: Dec. 13, 2018

(65) Prior Publication Data

US 2019/0229361 A1    Jul. 25, 2019

(30) Foreign Application Priority Data

Jan. 24, 2018    (KR) .................. 10-2018-0009015

(51) Int. Cl.
*H01M 10/04*    (2006.01)
*H01M 50/116*    (2021.01)
(Continued)

(52) U.S. Cl.
CPC ....... *H01M 10/049* (2013.01); *H01M 50/116* (2021.01); *H01M 50/124* (2021.01); *H01M 50/543* (2021.01); *H01M 50/557* (2021.01)

(58) Field of Classification Search
CPC .. H01M 10/04; H01M 2/0212; H01M 10/049; H01M 2/021; H01M 2/0287; H01M 2/0275; Y02E 60/10
See application file for complete search history.

(56) References Cited

U.S. PATENT DOCUMENTS

2002/0161617 A1*    10/2002    Washburn ............. G06Q 10/10
                                                      705/305
2006/0093905 A1*    5/2006    Kim .................... H01M 50/183
                                                      429/175
(Continued)

FOREIGN PATENT DOCUMENTS

EP        2375472        *    5/2011
EP        2 375 472 A1    10/2011
(Continued)

OTHER PUBLICATIONS

JP2015103370MT (Year: 2015).*
(Continued)

*Primary Examiner* — Alexander Usyatinsky
(74) *Attorney, Agent, or Firm* — Lewis Roca Rothgerber Christie LLP

(57) ABSTRACT

A secondary battery having improved safety and a manufacturing method thereof, which can suppress a voltage drop, heat generation, and/or ignition due to a minute short between a positive electrode plate and a negative electrode plate by preventing or substantially preventing an electrode assembly from moving within a laminate exterior case due to drop impact and/or collision are provided. A secondary battery includes: an electrode assembly including a first electrode plate, a second electrode plate, and a separator between the first electrode plate and the second electrode plate; a pouch exterior case including a planar long side region and a short side region to surround the electrode assembly; and adhesives in a dot array configuration at an outermost portion of the electrode assembly facing the planar long side region of the pouch exterior case.

22 Claims, 29 Drawing Sheets

(51) Int. Cl.
H01M 50/124 (2021.01)
H01M 50/543 (2021.01)
H01M 50/557 (2021.01)

(56) References Cited

U.S. PATENT DOCUMENTS

| | | |
|---|---|---|
| 2011/0244318 A1 | 10/2011 | Cho et al. |
| 2014/0272531 A1* | 9/2014 | Manning .............. H01M 2/1653 429/144 |
| 2014/0373343 A1* | 12/2014 | Park .................. H01M 10/0463 29/623.4 |
| 2015/0104684 A1* | 4/2015 | Kim .................... H01M 2/0287 429/94 |
| 2017/0141427 A1 | 5/2017 | Cho et al. |

FOREIGN PATENT DOCUMENTS

| | | |
|---|---|---|
| JP | 2015-103370 A | 6/2015 |
| KR | 10-2016-0075197 A | 6/2016 |
| KR | 10-2016-0110090 A | 9/2016 |
| KR | 10-2017-0055804 A | 5/2017 |

OTHER PUBLICATIONS

19153183,Decision_to_grant_a_European_patent,Oct. 15, 2020 (Year: 2020).*

Extended European Search Report for corresponding European Patent Application No. 19153183.9, dated May 20, 2019, 7 pages.

* cited by examiner

FIG. 16A

| Dot Size [mm] Before compression | Pitch [mm] | | | | | | | | |
|---|---|---|---|---|---|---|---|---|---|
| | 1 | 1.5 | 2 | 2.5 | 3 | 3.5 | 4 | 4.5 | 5 |
| 0.8 | 0.2 | 0.7 | 1.2 | 1.7 | 2.2 | 2.7 | 3.2 | 3.7 | 4.2 |
| 0.9 | 0.1 | 0.6 | 1.1 | 1.6 | 2.1 | 2.6 | 3.1 | 3.6 | 4.1 |
| 1 | 0 | 0.5 | 1 | 1.5 | 2 | 2.5 | 3 | 3.5 | 4 |
| 1.1 | -0.1 | 0.4 | 0.9 | 1.4 | 1.9 | 2.4 | 2.9 | 3.4 | 3.9 |
| 1.2 | -0.2 | 0.3 | 0.8 | 1.3 | 1.8 | 2.3 | 2.8 | 3.3 | 3.8 |
| 1.3 | -0.3 | 0.2 | 0.7 | 1.2 | 1.7 | 2.2 | 2.7 | 3.2 | 3.7 |
| 1.4 | -0.4 | 0.1 | 0.6 | 1.1 | 1.6 | 2.1 | 2.6 | 3.1 | 3.6 |
| 1.5 | -0.5 | 0 | 0.5 | 1 | 1.5 | 2 | 2.5 | 3 | 3.5 |
| 1.6 | -0.6 | -0.1 | 0.4 | 0.9 | 1.4 | 1.9 | 2.4 | 2.9 | 3.4 |
| 1.7 | -0.7 | -0.2 | 0.3 | 0.8 | 1.3 | 1.8 | 2.3 | 2.8 | 3.3 |
| 1.8 | -0.8 | -0.3 | 0.2 | 0.7 | 1.2 | 1.7 | 2.2 | 2.7 | 3.2 |
| 1.9 | -0.9 | -0.4 | 0.1 | 0.6 | 1.1 | 1.6 | 2.1 | 2.6 | 3.1 |
| 2 | -1 | -0.5 | 0 | 0.5 | 1 | 1.5 | 2 | 2.5 | 3 |
| 2.1 | -1.1 | -0.6 | -0.1 | 0.4 | 0.9 | 1.4 | 1.9 | 2.4 | 2.9 |
| 2.2 | -1.2 | -0.7 | -0.2 | 0.3 | 0.8 | 1.3 | 1.8 | 2.3 | 2.8 |
| 2.3 | -1.3 | -0.8 | -0.3 | 0.2 | 0.7 | 1.2 | 1.7 | 2.2 | 2.7 |
| 2.4 | -1.4 | -0.9 | -0.4 | 0.1 | 0.6 | 1.1 | 1.6 | 2.1 | 2.6 |
| 2.5 | -1.5 | -1 | -0.5 | 0 | 0.5 | 1 | 1.5 | 2 | 2.5 |
| 2.6 | -1.6 | -1.1 | -0.6 | -0.1 | 0.4 | 0.9 | 1.4 | 1.9 | 2.4 |
| 2.7 | -1.7 | -1.2 | -0.7 | -0.2 | 0.3 | 0.8 | 1.3 | 1.8 | 2.3 |
| 2.8 | -1.8 | -1.3 | -0.8 | -0.3 | 0.2 | 0.7 | 1.2 | 1.7 | 2.2 |
| 2.9 | -1.9 | -1.4 | -0.9 | -0.4 | 0.1 | 0.6 | 1.1 | 1.6 | 2.1 |
| 3 | -2 | -1.5 | -1 | -0.5 | 0 | 0.5 | 1 | 1.5 | 2 |
| 3.1 | -2.1 | -1.6 | -1.1 | -0.6 | -0.1 | 0.4 | 0.9 | 1.4 | 1.9 |
| 3.2 | -2.2 | -1.7 | -1.2 | -0.7 | -0.2 | 0.3 | 0.8 | 1.3 | 1.8 |
| 3.3 | -2.3 | -1.8 | -1.3 | -0.8 | -0.3 | 0.2 | 0.7 | 1.2 | 1.7 |
| 3.4 | -2.4 | -1.9 | -1.4 | -0.9 | -0.4 | 0.1 | 0.6 | 1.1 | 1.6 |
| 3.5 | -2.5 | -2 | -1.5 | -1 | -0.5 | 0 | 0.5 | 1 | 1.5 |
| 3.6 | -2.6 | -2.1 | -1.6 | -1.1 | -0.6 | -0.1 | 0.4 | 0.9 | 1.4 |
| 3.7 | -2.7 | -2.2 | -1.7 | -1.2 | -0.7 | -0.2 | 0.3 | 0.8 | 1.3 |
| 3.8 | -2.8 | -2.3 | -1.8 | -1.3 | -0.8 | -0.3 | 0.2 | 0.7 | 1.2 |
| 3.9 | -2.9 | -2.4 | -1.9 | -1.4 | -0.9 | -0.4 | 0.1 | 0.6 | 1.1 |
| 4 | -3 | -2.5 | -2 | -1.5 | -1 | -0.5 | 0 | 0.5 | 1 |
| 4.1 | -3.1 | -2.6 | -2.1 | -1.6 | -1.1 | -0.6 | -0.1 | 0.4 | 0.9 |
| 4.2 | -3.2 | -2.7 | -2.2 | -1.7 | -1.2 | -0.7 | -0.2 | 0.3 | 0.8 |
| 4.3 | -3.3 | -2.8 | -2.3 | -1.8 | -1.3 | -0.8 | -0.3 | 0.2 | 0.7 |
| 4.4 | -3.4 | -2.9 | -2.4 | -1.9 | -1.4 | -0.9 | -0.4 | 0.1 | 0.6 |
| 4.5 | -3.5 | -3 | -2.5 | -2 | -1.5 | -1 | -0.5 | 0 | 0.5 |
| 4.6 | -3.6 | -3.1 | -2.6 | -2.1 | -1.6 | -1.1 | -0.6 | -0.1 | 0.4 |
| 4.7 | -3.7 | -3.2 | -2.7 | -2.2 | -1.7 | -1.2 | -0.7 | -0.2 | 0.3 |
| 4.8 | -3.8 | -3.3 | -2.8 | -2.3 | -1.8 | -1.3 | -0.8 | -0.3 | 0.2 |
| 4.9 | -3.9 | -3.4 | -2.9 | -2.4 | -1.9 | -1.4 | -0.9 | -0.4 | 0.1 |
| 5 | -4 | -3.5 | -3 | -2.5 | -2 | -1.5 | -1 | -0.5 | 0 |

FIG. 16B

| Dot Size [mm] | | Pitch [mm] | | | | | | | | |
|---|---|---|---|---|---|---|---|---|---|---|
| Before compression | After compression | 1 | 1.5 | 2 | 2.5 | 3 | 3.5 | 4 | 4.5 | 5 |
| 0.8 | 1.12 | 99% | 44% | 25% | 16% | 11% | 8% | 6% | 5% | 4% |
| 0.9 | 1.26 | 125% | 55% | 31% | 20% | 14% | 10% | 8% | 6% | 5% |
| 1 | 1.4 | 154% | 68% | 38% | 25% | 17% | 13% | 10% | 8% | 6% |
| 1.1 | 1.54 | 186% | 83% | 47% | 30% | 21% | 15% | 12% | 9% | 7% |
| 1.2 | 1.68 | 222% | 99% | 55% | 35% | 25% | 18% | 14% | 11% | 9% |
| 1.3 | 1.82 | 260% | 116% | 65% | 42% | 29% | 21% | 16% | 13% | 10% |
| 1.4 | 1.96 | 302% | 134% | 75% | 48% | 34% | 25% | 19% | 15% | 12% |
| 1.5 | 2.1 | 346% | 154% | 87% | 55% | 38% | 28% | 22% | 17% | 14% |
| 1.6 | 2.24 | 394% | 175% | 99% | 63% | 44% | 32% | 25% | 19% | 16% |
| 1.7 | 2.38 | 445% | 198% | 111% | 71% | 49% | 36% | 28% | 22% | 18% |
| 1.8 | 2.52 | 499% | 222% | 125% | 80% | 55% | 41% | 31% | 25% | 20% |
| 1.9 | 2.66 | 556% | 247% | 139% | 89% | 62% | 45% | 35% | 27% | 22% |
| 2 | 2.8 | 616% | 274% | 154% | 99% | 68% | 50% | 38% | 30% | 25% |
| 2.1 | 2.94 | 679% | 302% | 170% | 109% | 75% | 55% | 42% | 34% | 27% |
| 2.2 | 3.08 | 745% | 331% | 186% | 119% | 83% | 61% | 47% | 37% | 30% |
| 2.3 | 3.22 | 814% | 362% | 204% | 130% | 90% | 66% | 51% | 40% | 33% |
| 2.4 | 3.36 | 887% | 394% | 222% | 142% | 99% | 72% | 55% | 44% | 35% |
| 2.5 | 3.5 | 962% | 428% | 241% | 154% | 107% | 79% | 60% | 48% | 38% |
| 2.6 | 3.64 | 1041% | 462% | 260% | 166% | 116% | 85% | 65% | 51% | 42% |
| 2.7 | 3.78 | 1122% | 499% | 281% | 180% | 125% | 92% | 70% | 55% | 45% |
| 2.8 | 3.92 | 1207% | 536% | 302% | 193% | 134% | 99% | 75% | 60% | 48% |
| 2.9 | 4.06 | 1295% | 575% | 324% | 207% | 144% | 106% | 81% | 64% | 52% |
| 3 | 4.2 | 1385% | 616% | 346% | 222% | 154% | 113% | 87% | 68% | 55% |
| 3.1 | 4.34 | 1479% | 657% | 370% | 237% | 164% | 121% | 92% | 73% | 59% |
| 3.2 | 4.48 | 1576% | 701% | 394% | 252% | 175% | 129% | 99% | 78% | 63% |
| 3.3 | 4.62 | 1676% | 745% | 419% | 268% | 186% | 137% | 105% | 83% | 67% |
| 3.4 | 4.76 | 1780% | 791% | 445% | 285% | 198% | 145% | 111% | 88% | 71% |
| 3.5 | 4.9 | 1886% | 838% | 471% | 302% | 210% | 154% | 118% | 93% | 75% |
| 3.6 | 5.04 | 1995% | 887% | 499% | 319% | 222% | 163% | 125% | 99% | 80% |
| 3.7 | 5.18 | 2107% | 937% | 527% | 337% | 234% | 172% | 132% | 104% | 84% |
| 3.8 | 5.32 | 2223% | 988% | 556% | 356% | 247% | 181% | 139% | 110% | 89% |
| 3.9 | 5.46 | 2341% | 1041% | 585% | 375% | 260% | 191% | 146% | 116% | 94% |
| 4 | 5.6 | 2463% | 1095% | 616% | 394% | 274% | 201% | 154% | 122% | 99% |
| 4.1 | 5.74 | 2588% | 1150% | 647% | 414% | 288% | 211% | 162% | 128% | 104% |
| 4.2 | 5.88 | 2715% | 1207% | 679% | 434% | 302% | 222% | 170% | 134% | 109% |
| 4.3 | 6.02 | 2846% | 1265% | 712% | 455% | 316% | 232% | 178% | 141% | 114% |
| 4.4 | 6.16 | 2980% | 1325% | 745% | 477% | 331% | 243% | 186% | 147% | 119% |
| 4.5 | 6.3 | 3117% | 1385% | 779% | 499% | 346% | 254% | 195% | 154% | 125% |
| 4.6 | 6.44 | 3257% | 1448% | 814% | 521% | 362% | 266% | 204% | 161% | 130% |
| 4.7 | 6.58 | 3400% | 1511% | 850% | 544% | 378% | 278% | 213% | 168% | 136% |
| 4.8 | 6.72 | 3547% | 1576% | 887% | 567% | 394% | 290% | 222% | 175% | 142% |
| 4.9 | 6.86 | 3696% | 1643% | 924% | 591% | 411% | 302% | 231% | 183% | 148% |
| 5 | 7 | 3848% | 1710% | 962% | 616% | 428% | 314% | 241% | 190% | 154% |

FIG. 16C

| Dot Size [mm] | | Pitch [mm] | | | | | | | | |
|---|---|---|---|---|---|---|---|---|---|---|
| Before compression | After compression | 1 | 1.5 | 2 | 2.5 | 3 | 3.5 | 4 | 4.5 | 5 |
| 0.8 | 1.12 | 0.8 | 0.5 | 0.4 | 0.3 | 0.3 | 0.2 | 0.2 | 0.2 | 0.2 |
| 0.9 | 1.26 | 0.9 | 0.6 | 0.5 | 0.4 | 0.3 | 0.3 | 0.2 | 0.2 | 0.2 |
| 1 | 1.4 | 1.0 | 0.7 | 0.5 | 0.4 | 0.3 | 0.3 | 0.3 | 0.2 | 0.2 |
| 1.1 | 1.54 | 1.1 | 0.7 | 0.6 | 0.4 | 0.4 | 0.3 | 0.3 | 0.2 | 0.2 |
| 1.2 | 1.68 | 1.2 | 0.8 | 0.6 | 0.5 | 0.4 | 0.3 | 0.3 | 0.3 | 0.2 |
| 1.3 | 1.82 | 1.3 | 0.9 | 0.7 | 0.5 | 0.4 | 0.4 | 0.3 | 0.3 | 0.3 |
| 1.4 | 1.96 | 1.4 | 0.9 | 0.7 | 0.6 | 0.5 | 0.4 | 0.4 | 0.3 | 0.3 |
| 1.5 | 2.1 | 1.5 | 1.0 | 0.8 | 0.6 | 0.5 | 0.4 | 0.4 | 0.3 | 0.3 |
| 1.6 | 2.24 | 1.6 | 1.1 | 0.8 | 0.6 | 0.5 | 0.5 | 0.4 | 0.4 | 0.3 |
| 1.7 | 2.38 | 1.7 | 1.1 | 0.9 | 0.7 | 0.6 | 0.5 | 0.4 | 0.4 | 0.3 |
| 1.8 | 2.52 | 1.8 | 1.2 | 0.9 | 0.7 | 0.6 | 0.5 | 0.5 | 0.4 | 0.4 |
| 1.9 | 2.66 | 1.9 | 1.3 | 1.0 | 0.8 | 0.6 | 0.5 | 0.5 | 0.4 | 0.4 |
| 2 | 2.8 | 2.0 | 1.3 | 1.0 | 0.8 | 0.7 | 0.6 | 0.5 | 0.4 | 0.4 |
| 2.1 | 2.94 | 2.1 | 1.4 | 1.1 | 0.8 | 0.7 | 0.6 | 0.5 | 0.5 | 0.4 |
| 2.2 | 3.08 | 2.2 | 1.5 | 1.1 | 0.9 | 0.7 | 0.6 | 0.6 | 0.5 | 0.4 |
| 2.3 | 3.22 | 2.3 | 1.5 | 1.2 | 0.9 | 0.8 | 0.7 | 0.6 | 0.5 | 0.5 |
| 2.4 | 3.36 | 2.4 | 1.6 | 1.2 | 1.0 | 0.8 | 0.7 | 0.6 | 0.5 | 0.5 |
| 2.5 | 3.5 | 2.5 | 1.7 | 1.3 | 1.0 | 0.8 | 0.7 | 0.6 | 0.6 | 0.5 |
| 2.6 | 3.64 | 2.6 | 1.7 | 1.3 | 1.0 | 0.9 | 0.7 | 0.7 | 0.6 | 0.5 |
| 2.7 | 3.78 | 2.7 | 1.8 | 1.4 | 1.1 | 0.9 | 0.8 | 0.7 | 0.6 | 0.5 |
| 2.8 | 3.92 | 2.8 | 1.9 | 1.4 | 1.1 | 0.9 | 0.8 | 0.7 | 0.6 | 0.6 |
| 2.9 | 4.06 | 2.9 | 1.9 | 1.5 | 1.2 | 1.0 | 0.8 | 0.7 | 0.6 | 0.6 |
| 3 | 4.2 | 3.0 | 2.0 | 1.5 | 1.2 | 1.0 | 0.9 | 0.8 | 0.7 | 0.6 |
| 3.1 | 4.34 | 3.1 | 2.1 | 1.6 | 1.2 | 1.0 | 0.9 | 0.8 | 0.7 | 0.6 |
| 3.2 | 4.48 | 3.2 | 2.1 | 1.6 | 1.3 | 1.1 | 0.9 | 0.8 | 0.7 | 0.6 |
| 3.3 | 4.62 | 3.3 | 2.2 | 1.7 | 1.3 | 1.1 | 0.9 | 0.8 | 0.7 | 0.7 |
| 3.4 | 4.76 | 3.4 | 2.3 | 1.7 | 1.4 | 1.1 | 1.0 | 0.9 | 0.8 | 0.7 |
| 3.5 | 4.9 | 3.5 | 2.3 | 1.8 | 1.4 | 1.2 | 1.0 | 0.9 | 0.8 | 0.7 |
| 3.6 | 5.04 | 3.6 | 2.4 | 1.8 | 1.4 | 1.2 | 1.0 | 0.9 | 0.8 | 0.7 |
| 3.7 | 5.18 | 3.7 | 2.5 | 1.9 | 1.5 | 1.2 | 1.1 | 0.9 | 0.8 | 0.7 |
| 3.8 | 5.32 | 3.8 | 2.5 | 1.9 | 1.5 | 1.3 | 1.1 | 1.0 | 0.8 | 0.8 |
| 3.9 | 5.46 | 3.9 | 2.6 | 2.0 | 1.6 | 1.3 | 1.1 | 1.0 | 0.9 | 0.8 |
| 4 | 5.6 | 4.0 | 2.7 | 2.0 | 1.6 | 1.3 | 1.1 | 1.0 | 0.9 | 0.8 |
| 4.1 | 5.74 | 4.1 | 2.7 | 2.1 | 1.6 | 1.4 | 1.2 | 1.0 | 0.9 | 0.8 |
| 4.2 | 5.88 | 4.2 | 2.8 | 2.1 | 1.7 | 1.4 | 1.2 | 1.1 | 0.9 | 0.8 |
| 4.3 | 6.02 | 4.3 | 2.9 | 2.2 | 1.7 | 1.4 | 1.2 | 1.1 | 1.0 | 0.9 |
| 4.4 | 6.16 | 4.4 | 2.9 | 2.2 | 1.8 | 1.5 | 1.3 | 1.1 | 1.0 | 0.9 |
| 4.5 | 6.3 | 4.5 | 3.0 | 2.3 | 1.8 | 1.5 | 1.3 | 1.1 | 1.0 | 0.9 |
| 4.6 | 6.44 | 4.6 | 3.1 | 2.3 | 1.8 | 1.5 | 1.3 | 1.2 | 1.0 | 0.9 |
| 4.7 | 6.58 | 4.7 | 3.1 | 2.4 | 1.9 | 1.6 | 1.3 | 1.2 | 1.0 | 0.9 |
| 4.8 | 6.72 | 4.8 | 3.2 | 2.4 | 1.9 | 1.6 | 1.4 | 1.2 | 1.1 | 1.0 |
| 4.9 | 6.86 | 4.9 | 3.3 | 2.5 | 2.0 | 1.6 | 1.4 | 1.2 | 1.1 | 1.0 |
| 5 | 7 | 5.0 | 3.3 | 2.5 | 2.0 | 1.7 | 1.4 | 1.3 | 1.1 | 1.0 |

FIG. 16D

| Dot Size [mm] | | Pitch [mm] | | | | | | | | |
|---|---|---|---|---|---|---|---|---|---|---|
| Before compression | After compression | 1 | 1.5 | 2 | 2.5 | 3 | 3.5 | 4 | 4.5 | 5 |
| 0.8 | 1.12 | 1.1 | 0.7 | 0.6 | 0.4 | 0.4 | 0.3 | 0.3 | 0.2 | 0.2 |
| 0.9 | 1.26 | 1.3 | 0.8 | 0.6 | 0.5 | 0.4 | 0.4 | 0.3 | 0.3 | 0.3 |
| 1 | 1.4 | 1.4 | 0.9 | 0.7 | 0.6 | 0.5 | 0.4 | 0.4 | 0.3 | 0.3 |
| 1.1 | 1.54 | 1.5 | 1.0 | 0.8 | 0.6 | 0.5 | 0.4 | 0.4 | 0.3 | 0.3 |
| 1.2 | 1.68 | 1.7 | 1.1 | 0.8 | 0.7 | 0.6 | 0.5 | 0.4 | 0.4 | 0.3 |
| 1.3 | 1.82 | 1.8 | 1.2 | 0.9 | 0.7 | 0.6 | 0.5 | 0.5 | 0.4 | 0.4 |
| 1.4 | 1.96 | 2.0 | 1.3 | 1.0 | 0.8 | 0.7 | 0.6 | 0.5 | 0.4 | 0.4 |
| 1.5 | 2.1 | 2.1 | 1.4 | 1.1 | 0.8 | 0.7 | 0.6 | 0.5 | 0.5 | 0.4 |
| 1.6 | 2.24 | 2.2 | 1.5 | 1.1 | 0.9 | 0.7 | 0.6 | 0.6 | 0.5 | 0.4 |
| 1.7 | 2.38 | 2.4 | 1.6 | 1.2 | 1.0 | 0.8 | 0.7 | 0.6 | 0.5 | 0.5 |
| 1.8 | 2.52 | 2.5 | 1.7 | 1.3 | 1.0 | 0.8 | 0.7 | 0.6 | 0.6 | 0.5 |
| 1.9 | 2.66 | 2.7 | 1.8 | 1.3 | 1.1 | 0.9 | 0.8 | 0.7 | 0.6 | 0.5 |
| 2 | 2.8 | 2.8 | 1.9 | 1.4 | 1.1 | 0.9 | 0.8 | 0.7 | 0.6 | 0.6 |
| 2.1 | 2.94 | 2.9 | 2.0 | 1.5 | 1.2 | 1.0 | 0.8 | 0.7 | 0.7 | 0.6 |
| 2.2 | 3.08 | 3.1 | 2.1 | 1.5 | 1.2 | 1.0 | 0.9 | 0.8 | 0.7 | 0.6 |
| 2.3 | 3.22 | 3.2 | 2.1 | 1.6 | 1.3 | 1.1 | 0.9 | 0.8 | 0.7 | 0.6 |
| 2.4 | 3.36 | 3.4 | 2.2 | 1.7 | 1.3 | 1.1 | 1.0 | 0.8 | 0.7 | 0.7 |
| 2.5 | 3.5 | 3.5 | 2.3 | 1.8 | 1.4 | 1.2 | 1.0 | 0.9 | 0.8 | 0.7 |
| 2.6 | 3.64 | 3.6 | 2.4 | 1.8 | 1.5 | 1.2 | 1.0 | 0.9 | 0.8 | 0.7 |
| 2.7 | 3.78 | 3.8 | 2.5 | 1.9 | 1.5 | 1.3 | 1.1 | 0.9 | 0.8 | 0.8 |
| 2.8 | 3.92 | 3.9 | 2.6 | 2.0 | 1.6 | 1.3 | 1.1 | 1.0 | 0.9 | 0.8 |
| 2.9 | 4.06 | 4.1 | 2.7 | 2.0 | 1.6 | 1.4 | 1.2 | 1.0 | 0.9 | 0.8 |
| 3 | 4.2 | 4.2 | 2.8 | 2.1 | 1.7 | 1.4 | 1.2 | 1.1 | 0.9 | 0.8 |
| 3.1 | 4.34 | 4.3 | 2.9 | 2.2 | 1.7 | 1.4 | 1.2 | 1.1 | 1.0 | 0.9 |
| 3.2 | 4.48 | 4.5 | 3.0 | 2.2 | 1.8 | 1.5 | 1.3 | 1.1 | 1.0 | 0.9 |
| 3.3 | 4.62 | 4.6 | 3.1 | 2.3 | 1.8 | 1.5 | 1.3 | 1.2 | 1.0 | 0.9 |
| 3.4 | 4.76 | 4.8 | 3.2 | 2.4 | 1.9 | 1.6 | 1.4 | 1.2 | 1.1 | 1.0 |
| 3.5 | 4.9 | 4.9 | 3.3 | 2.5 | 2.0 | 1.6 | 1.4 | 1.2 | 1.1 | 1.0 |
| 3.6 | 5.04 | 5.0 | 3.4 | 2.5 | 2.0 | 1.7 | 1.4 | 1.3 | 1.1 | 1.0 |
| 3.7 | 5.18 | 5.2 | 3.5 | 2.6 | 2.1 | 1.7 | 1.5 | 1.3 | 1.2 | 1.0 |
| 3.8 | 5.32 | 5.3 | 3.5 | 2.7 | 2.1 | 1.8 | 1.5 | 1.3 | 1.2 | 1.1 |
| 3.9 | 5.46 | 5.5 | 3.6 | 2.7 | 2.2 | 1.8 | 1.6 | 1.4 | 1.2 | 1.1 |
| 4 | 5.6 | 5.6 | 3.7 | 2.8 | 2.2 | 1.9 | 1.6 | 1.4 | 1.2 | 1.1 |
| 4.1 | 5.74 | 5.7 | 3.8 | 2.9 | 2.3 | 1.9 | 1.6 | 1.4 | 1.3 | 1.1 |
| 4.2 | 5.88 | 5.9 | 3.9 | 2.9 | 2.4 | 2.0 | 1.7 | 1.5 | 1.3 | 1.2 |
| 4.3 | 6.02 | 6.0 | 4.0 | 3.0 | 2.4 | 2.0 | 1.7 | 1.5 | 1.3 | 1.2 |
| 4.4 | 6.16 | 6.2 | 4.1 | 3.1 | 2.5 | 2.1 | 1.8 | 1.5 | 1.4 | 1.2 |
| 4.5 | 6.3 | 6.3 | 4.2 | 3.2 | 2.5 | 2.1 | 1.8 | 1.6 | 1.4 | 1.3 |
| 4.6 | 6.44 | 6.4 | 4.3 | 3.2 | 2.6 | 2.1 | 1.8 | 1.6 | 1.4 | 1.3 |
| 4.7 | 6.58 | 6.6 | 4.4 | 3.3 | 2.6 | 2.2 | 1.9 | 1.6 | 1.5 | 1.3 |
| 4.8 | 6.72 | 6.7 | 4.5 | 3.4 | 2.7 | 2.2 | 1.9 | 1.7 | 1.5 | 1.3 |
| 4.9 | 6.86 | 6.9 | 4.6 | 3.4 | 2.7 | 2.3 | 2.0 | 1.7 | 1.5 | 1.4 |
| 5 | 7 | 7.0 | 4.7 | 3.5 | 2.8 | 2.3 | 2.0 | 1.8 | 1.6 | 1.4 |

SECONDARY BATTERY AND MANUFACTURING METHOD THEREOF

CROSS-REFERENCE TO RELATED APPLICATION

This application claims priority to and the benefit of Korean Patent Application No. 10-2018-0009015, filed on Jan. 24, 2018 in the Korean Intellectual Property Office, the entire content of which is herein incorporated by reference.

BACKGROUND

1. Field

Aspects of embodiments of the present disclosure relate to a secondary battery and a manufacturing method thereof.

2. Description of Related Art

Unlike a primary battery that cannot be charged, a secondary battery is a rechargeable and dischargeable battery. A low-capacity secondary battery may be used for various portable small-sized electronic devices, such as a smartphone, a feature phone, a notebook computer, a digital camera, or a camcorder, and a high-capacity secondary battery is widely used as a power source for motor drives, such as those in hybrid vehicles or electric vehicles.

The secondary battery may include an electrode assembly including a positive electrode and a negative electrode, an exterior case accommodating the electrode assembly, and electrode terminals connected to the electrode assembly. The secondary battery may be classified into a cylindrical type, a prismatic type, a pouch type, and so on, according to the shape of the exterior case. Specifically, the pouch type secondary battery can be easily configured in various shapes and can be formed using a lightweight laminate exterior case.

The above information disclosed in this Background section is for enhancement of understanding of the background of the described technology and, therefore, it may contain information that does not form the prior art that is already known in this country to a person of ordinary skill in the art.

SUMMARY

According to aspects of embodiments of the present disclosure, a secondary battery having improved safety and a manufacturing method thereof are provided, which can suppress a voltage drop, heat generation, and/or ignition due to a minute short between a positive electrode plate and a negative electrode plate by preventing or substantially preventing an electrode assembly from moving within a laminate exterior case due to a drop impact and/or a collision.

According to further aspects of embodiments of the present disclosure, a secondary battery and a manufacturing method thereof are provided, which can improve life characteristics by uniformly compressing a whole region of the electrode assembly, rather than compressing local regions of the electrode assembly, during the manufacture of the secondary battery.

According to further aspects of embodiments of the present disclosure, a secondary battery and a manufacturing method thereof, are provided, which can improve an adhesion strength between an electrode assembly and a laminate exterior case.

The above and other aspects of the present disclosure will be described in or be apparent from the following description of some exemplary embodiments.

According to one or more embodiments of the present disclosure, a secondary battery includes: an electrode assembly including a first electrode plate, a second electrode plate and a separator between the first electrode plate and the second electrode plate; a pouch exterior case including a planar long side region and a short side region to surround the electrode assembly; and adhesives in a dot array configuration at an outermost portion of the electrode assembly facing the planar long side region of the pouch exterior case.

After compressing the pouch exterior case and the electrode assembly, a dot size to pitch ratio of the adhesives in the dot array configuration may be in a range of 0.7 to 1.4.

The first electrode plate or the second electrode plate of the electrode assembly may face the planar long side region of the pouch exterior case, and a first uncoated portion or a second uncoated portion of the first electrode plate or the second electrode plate may face the planar long side region of the pouch exterior case.

The adhesives may include polar adhesives.

The separator of the electrode assembly may face the planar long side region of the pouch exterior case, and the adhesive may include non-polar adhesives.

The adhesives in the dot array configuration may include adhesives in a regular quadrilateral shape or in a zigzag shape in which neighboring columns cross each other.

Before compressing the pouch exterior case and the electrode assembly, the adhesives in the dot array configuration may be shaped of triangles, quadrangles, pentagons, hexagons, polygons, circles, or stars, which are spaced apart from each other with empty spaces therebetween, and after compressing the pouch exterior case and the electrode assembly, the adhesives in the dot array configuration may be configured to overlap each other without empty spaces.

The adhesives in the dot array configuration may overlap each other to form a line, and the line may include multiple lines.

An area of the adhesives may be 30% to 90% of an area of one surface of the electrode assembly.

An area of the adhesives may be greater than 40% of an area occupied by an outermost periphery of the adhesives.

The adhesives may have a thickness in a range of 1 μm to 50 μm.

The adhesives may have a peel strength in a range of 300 gf/25 mm to 2500 gf/25 mm.

The adhesives may have a pitch in a range of 1 mm to 5 mm and a diameter in a range of 0.8 mm to 5 mm.

After the compressing, the adhesives may have a pitch in a range of 1 mm to 5 mm and an equivalent diameter in a range of 1.1 mm to 7 mm.

The adhesives may include any one polymer selected from the group consisting of cellulose, polyvinylidenefluoride-cohexafluoropropylene, polyvinylidene fluoride-cotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose, and polypropylene-maleic acid anhydride, or a mixture of two or more polymers of said group.

The adhesives may be shaped of deformed circles or may be deformed by overlapping portions thereof in contact with each other.

The electrode assembly may include a first long side region and a second long side region formed at opposite regions spaced apart from each other, and short side regions formed at opposite regions spaced apart from each other and connecting the first and second long side regions, and the adhesives may be on any one of the first long side region and the second long side region or on both of the first long side region and the second long side region.

The electrode assembly may further include a finishing tape attached to the second long side region, and the adhesives in the dot array configuration may be on the finishing tape and the second long side region positioned at an exterior side of the finishing tape.

The electrode assembly may further include a first electrode tab extending from the first electrode plate to the outside and a second electrode tab extending from the second electrode plate to the outside, and the adhesives may be at the outermost portion of the electrode assembly, excluding regions corresponding to the first and second electrode tabs.

The electrode assembly may further include a finishing tape for finishing the outermost portion of the electrode assembly, and the adhesives may be at the outermost portion of the electrode assembly, excluding a region corresponding to the finishing tape.

According to one or more embodiments of the present disclosure, a manufacturing method of a secondary battery includes: providing an electrode assembly including a first electrode plate, a second electrode plate, and a separator between the first electrode plate and the second electrode plate; dispensing adhesives to an outermost portion of the electrode assembly in a dot array configuration; accommodating the electrode assembly having the adhesives dispensed thereto in a pouch exterior case including planar long side regions; and compressing the planar long side regions of the pouch exterior case, the adhesives, and the electrode assembly, wherein before compressing the planar long side regions of the pouch exterior case, the adhesives, and the electrode assembly, a dot size to pitch ratio of the adhesives is in a range from 0.5 to 1.0.

The adhesives may be formed by a piezoelectric jetting process.

As described above, in a secondary battery according to various embodiments of the present disclosure and a manufacturing method thereof, a minute short between a positive electrode plate and a negative electrode can be suppressed by preventing or substantially preventing an electrode assembly from moving within a laminate exterior case due to drop impact and/or collision, thereby suppressing a voltage drop, heat generation, and/or ignition.

In some examples, in a secondary battery according to various embodiments of the present disclosure and a manufacturing method thereof, before compressing an electrode assembly and a laminate exterior case, adhesives are formed on a surface or regions of the electrode assembly making contact with the laminate exterior case in a dot array or matrix configuration, thereby allowing an electrolyte solution to freely move through the adhesives formed in the dot array or matrix configuration during injection of the electrolyte solution.

In addition, in a secondary battery according to various embodiments of the present disclosure and a manufacturing method thereof, after compressing an electrode assembly and a laminate exterior case, adhesives dispensed in a dot array or matrix configuration may be distributed over a wide area to form adhesion regions having an increased area, thereby improving an adhesion strength between the electrode assembly and the laminate exterior case.

In addition, in a secondary battery according to various embodiments of the present disclosure and a manufacturing method thereof, life characteristics of the secondary battery can be improved by uniformly compressing the overall area of the electrode assembly, rather than compressing local regions of the electrode assembly, during the manufacture of the secondary battery.

In some examples, in a secondary battery according to various embodiments of the present disclosure and a manufacturing method thereof, adhesives are formed to be widely distributed to a uniform thickness to whole regions of one surface or both surfaces of the electrode assembly in a dot array or matrix configuration, such that a force derived from a thermal compression jig at the time of thermally compressing the electrode assembly and a laminate exterior case using the thermal compression jig may be uniformly applied to the overall area of the electrode assembly. Therefore, the electrode assembly may undergo a slight change in its physical properties, and the life characteristics of the secondary battery can be improved accordingly.

In addition, in a secondary battery according to various embodiments of the present disclosure and a manufacturing method thereof, an adhesion strength between an electrode assembly and a laminate exterior case can be improved.

In some examples, in a secondary battery according to various embodiments of the present disclosure and a manufacturing method thereof, when an outermost portion of the electrode assembly is a metal layer, the metal layer may be adhered to a laminate exterior case (made of an insulation layer) using polar adhesives. When the outermost portion of the electrode assembly is a separator, the separator is adhered to the laminate exterior case (made of an insulation layer) using non-polar adhesives. Accordingly, an adhesion strength between the electrode assembly and the laminate exterior case can be improved.

BRIEF DESCRIPTION OF THE DRAWINGS

The above and other features and advantages of the present disclosure will become more apparent by describing in detail preferred embodiments thereof with reference to the attached drawings in which:

FIG. 16A lists, for comparative analysis, overlapping rates of yet-to-be compressed adhesives were tested according to dot sizes of and pitches between the adhesives.

FIG. 16B indicates increasing rates expressed in dot size.

FIG. 16C indicates dot size/pitch ratios of adhesives before compression.

FIG. 16D indicates dot size/pitch ratios of the adhesives after compression.

DESCRIPTION OF REFERENCE NUMERALS

Figure 1A:
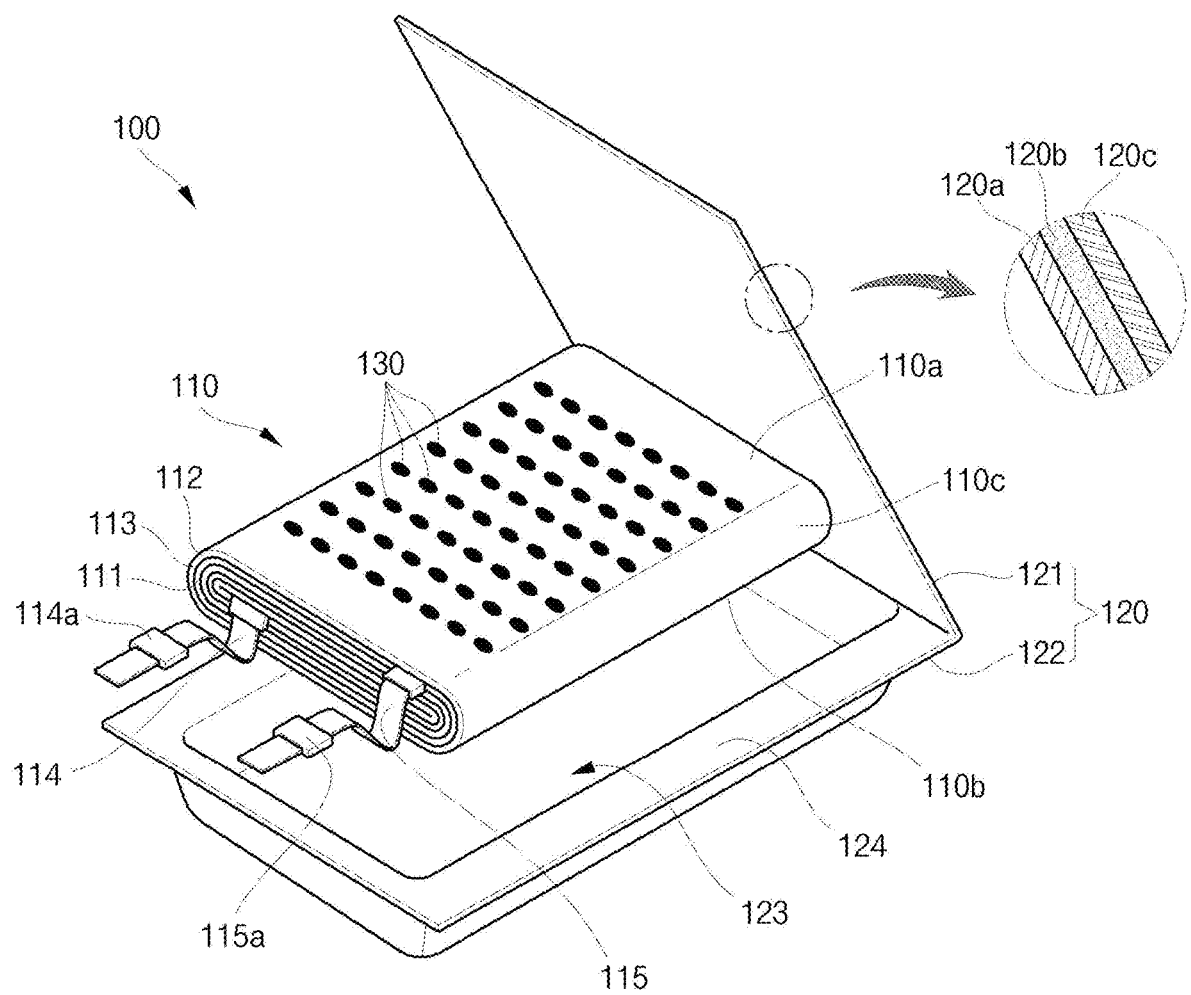
FIGS. 1A to 1C are an exploded perspective view, a bottom view, and a partial bottom perspective view, respectively, of a secondary battery according to one or more embodiments of the present disclosure.

| | |
|---|---|
| 100: Secondary battery | 110: Electrode assembly |
| 111: Negative electrode plate | 112: Positive electrode plate |
| 114: Negative electrode tab | 115: Positive electrode tab |
| 116: Adhesive layer (sealing tape or finishing tape) | |
| 120: Laminate exterior case | 130: Adhesives |

DETAILED DESCRIPTION

Herein, some exemplary embodiments of the present disclosure will be described in further detail.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present and the element A and the element B may be indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms; such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
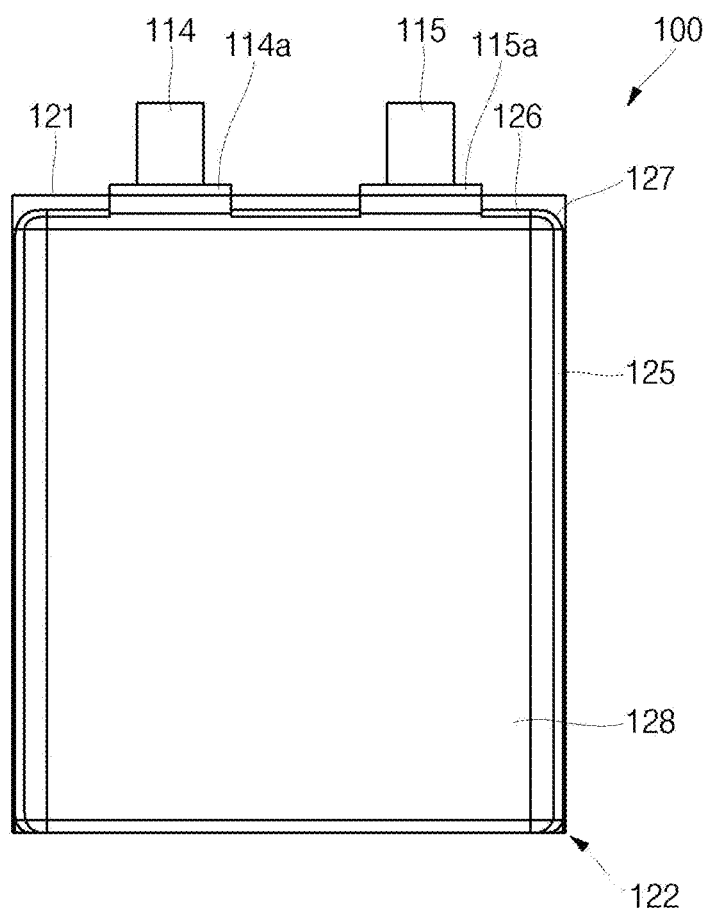
Figure 1C:
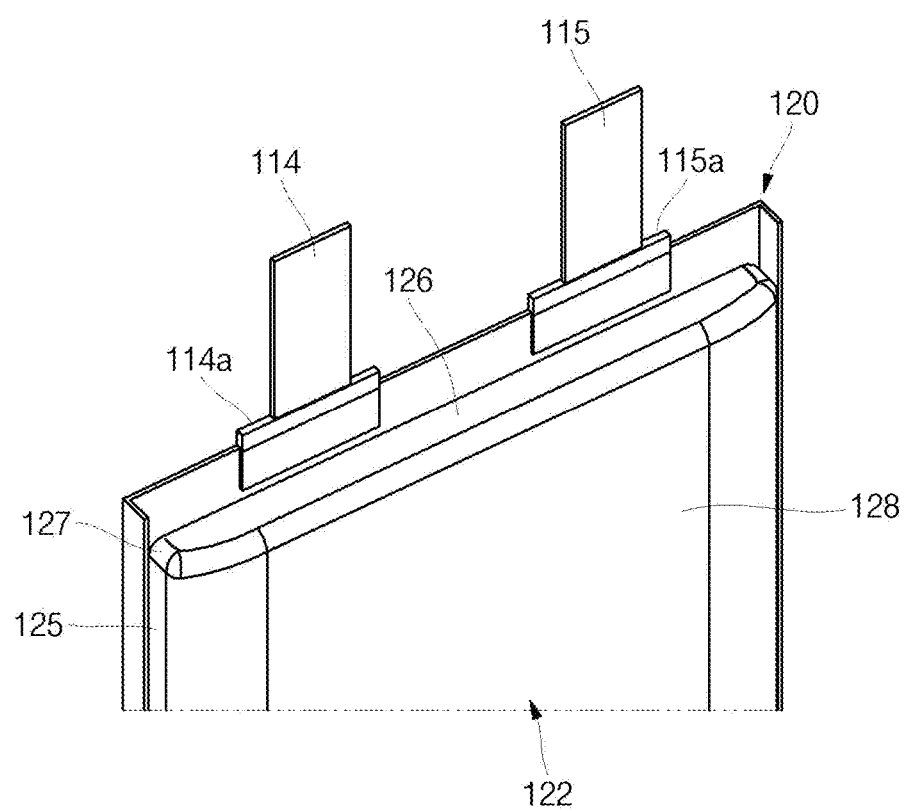

Referring to FIGS. 1A to 1C, an exploded perspective view, a bottom view, and a partial bottom perspective view of a secondary battery 100 according to one or more embodiments of the present disclosure are respectively illustrated.

As illustrated in FIGS. 1A to 1C, the secondary battery 100 according to one or more embodiments of the present disclosure may include an electrode assembly 110, a laminate exterior case or a pouch exterior case 120, and adhesives 130 dispensed in a dot array configuration or in a matrix configuration to adhere the electrode assembly 110 to the laminate exterior case 120.

The electrode assembly 110 may include a negative electrode plate 111, a positive electrode plate 112, and a separator 113 interposed between the negative electrode plate 111 and the positive electrode plate 112. The electrode assembly 110 may be formed in a winding type in which a stacked structure of the negative electrode plate 111, the separator 113, and the positive electrode plate 112 is wound in a jelly-roll configuration, or in a stack type in which the negative electrode plate 111, the separator 113, and the positive electrode plate 112 are repeatedly stacked multiple times in that order. Accordingly, one of the negative electrode plate 111, the positive electrode plate 112, and the separator 113 may be positioned on an outermost portion of the winding type or stack type electrode assembly 110.

The negative electrode plate 111 may include a negative electrode active material layer coated on both surfaces of a negative electrode collector plate made of a conductive metal thin plate, e.g., a copper or nickel foil or mesh, but aspects of the present disclosure are not limited thereto. For example, a carbon-based material, Si, Sn, tin oxide, a tin alloy composite, transition metal oxide, lithium metal nitride, or metal oxide, may be used as the negative electrode active material layer, but aspects of the present disclosure are not limited thereto. For example, a substantially planar negative electrode tab 114 may be fixed (e.g., welded) to a negative electrode uncoated portion of the negative electrode collector plate, where the negative electrode active material layer is not formed, but aspects of the present disclosure are not limited thereto. In some examples, one end of the negative electrode tab 114 may be electrically connected to the negative electrode uncoated portion and the other end thereof may protrude and extend to the outside. In an embodiment, an insulation member 114a may be attached to the negative electrode tab 114 to prevent or substantially prevent an electrical short between the negative electrode tab 114 and the laminate exterior case 120

The positive electrode plate 112 may include a positive electrode active material layer coated on both surfaces of a positive electrode collector plate made of, for example, a highly conductive metal thin plate, e.g., an aluminum foil or mesh, but aspects of the present disclosure are not limited thereto. For example, a chalcogenide compound may be used as the positive electrode active material layer, but aspects of the present disclosure are not limited thereto. For example, a composite metal oxide, e.g., LiCoO2, LiMn2O4, LiNiO2, or LiNiMnO2, may be used as the positive electrode active material layer. For example, a positive electrode tab 115 may be fixed (e.g., welded) to a positive electrode uncoated portion of the positive electrode collector plate, where the positive electrode active material layer is not formed, but aspects of the present disclosure are not limited thereto. In an embodiment, an insulation member 115a may be attached to the positive electrode tab 115 to prevent or substantially prevent an electrical short between the positive electrode tab 115 and the laminate exterior case 120.

The separator 113 is interposed between the negative electrode plate 111 and the positive, electrode plate 112 to prevent or substantially prevent an electrical short between the negative electrode plate 111 and the positive electrode plate 112. The separator 113 includes a pair of separators, and the negative electrode plate 111 is disposed to be held between the pair of separator 113. In an embodiment, the separator 113 may include one selected from the group consisting of, for example, polyethylene, polypropylene, and a porous copolymer of polyethylene and polypropylene, but aspects of the present disclosure are not limited thereto. To prevent or substantially prevent an electrical short between the negative electrode plate 111 and the positive electrode plate 112, the separator 113 may be formed to have a larger width than the negative electrode plate 111 and the positive electrode plate 112.

The electrode assembly 110 may include a first long side region 110a that is relatively wide and planar, a second long side region 110b that is opposite to the first long side region 110a and relatively wide and planar, and plural (e.g., four) curved short side regions 110c connecting the first and second long side regions 110a and 110b. Here, the adhesives 130 may be dispensed to the first long side region 110a or the second long side region 110b of the electrode assembly 110 in a dot array configuration or a matrix configuration.

The laminate exterior case 120 may accommodate the electrode assembly 110 and may be formed by sealing around an outer periphery of the electrode assembly 110. The laminate exterior case 120 may include a first exterior case portion 121 and a second exterior case portion 122 having an end connected to the first exterior case portion 121, and a recess 123 having a depth (e.g., a predetermined depth) to accommodate the electrode assembly 110.

In an embodiment, edges 124 of the first and second exterior case portions 121 and 122, corresponding to the outer periphery of the electrode assembly 110, are thermally fused to each other, thereby accommodating the electrode assembly 110 within the laminate exterior case 120 of a substantially pouch or pocket type.

In some examples, the laminate exterior case 120 includes the first exterior case portion 121 and the second exterior case portion 122 by bending the center of one side of the laminate exterior case 120 in a lengthwise direction. The second exterior case portion 122 has the recess 123 having a depth (e.g., a predetermined depth) by pressing or drawing so as to accommodate the electrode assembly 110, and a sealing portion 124, i.e., the edge of the second exterior case portion 122, is formed on the outer periphery of the recess 123 to be sealed with the first exterior case portion 121. In an embodiment, the sealing portion 124, may be formed along a side where the first exterior case portion 121 and the second exterior case portion 122 integrally adjoin each other, and the other three sides of each of the first exterior case portion 121 and the second exterior case portion 122.

In an embodiment, the second exterior case portion 122 may include four extending regions extending away from the first exterior case portion 121 and a planar region connected to the four extending regions and corresponding to a bottom of the recess 123.

In an embodiment, the first long side region 110a of the electrode assembly 110 makes contact with the substantially planar first exterior case portion 121, and the second long side region 110b and the short side regions 110c of the electrode assembly 110 make contact with the second exterior case portion 122. In an embodiment, when the adhesives 130 are dispensed to the first long side region 110a of the electrode assembly 110 in the dot array configuration, the first long side region 110a of the electrode assembly 110 and the first exterior case portion 121 of the laminate exterior case 120 may be adhered to each other. In an embodiment, when the adhesives 130 are dispensed to the second long side region 110b of the electrode assembly 110 in the dot array configuration, the second long side region 110b of the electrode assembly 110 and the substantially planar second exterior case portion 122 of the laminate exterior case 120 may be adhered to each other.

The negative electrode tab 114 and the positive electrode tab 115 of the electrode assembly 110 are drawn to the outside through fused regions of the first exterior case portion 121 and the second exterior case portion 122. Here, the insulation members 114a and 115b formed in the negative electrode tab 114 and positive electrode tab 115 are also sealed with the sealing portion 124. In some examples, the insulation members 114a and 115b are formed on contact portions between the negative electrode tab 114 and the positive electrode tab 115 and the sealing portion 124 to prevent or substantially prevent electrical shorts between the negative electrode tab 114 and the positive electrode tab 115 and the laminate exterior case 120.

The laminate exterior case 120 may be formed in a multi-layered structure including, for example, a first insulation layer 120a, a metal layer 120b and a second insulation layer 120c, but aspects of the present disclosure are not limited thereto. Additionally, various adhesives layers or functional layers may further be provided, but descriptions thereof will not be given so as not to obscure the subject matter of the present disclosure.

The first insulation layer 120a defines an internal surface of the laminate exterior case 120 and is made of an insulating and thermally adhesive material. In addition, the first insulation layer 120a is formed on a first surface of the metal layer 120b and defines an internal surface of the laminate exterior case 120 facing the electrode assembly 110. The first insulation layer 120a may be made of, for example, casted polypropylene (CPP) or an equivalent thereof, which is not reactive with an electrolyte, but aspects of the present disclosure are not limited thereto. If the electrode assembly 110 is accommodated in the recess 123 of the second exterior case portion 122 and is covered with the first exterior case portion 121, the first insulation layer 120a and the sealing portion 124 of the laminate exterior case 120 are brought into contact with each other. Therefore, if the sealing portion 124 is thermally fused, the first insulation layers 120a of the first and second exterior case portions 121 and 122 are adhered to each other, thereby sealing the laminate exterior case 120.

The metal layer 120b is interposed between the first insulation layer 120a and the second insulation layer 120c, prevents or substantially prevents external moisture and oxygen from penetrating into the laminate exterior case 120, and prevents or substantially prevents an electrolyte filled in the laminate exterior case 120 from leaking to the outside. In addition, the metal layer 120b maintains mechanical strength of the laminate exterior case 120. Generally, the metal layer 120b may be made of, for example, aluminum, an aluminum alloy, iron, or an iron alloy, but aspects of the present disclosure are not limited thereto.

The second insulation layer 120c defines an external surface of the laminate exterior case 120 and serves to absorb mechanical and chemical shocks, e.g., from an external electric device. In addition, the second insulation layer 120c is formed on a second surface of the metal layer 120b, and defines an external surface of the laminate exterior case 120. The second insulation layer 120c may be made of, for example, nylon, polyethylene terephthalate (PET), polybutylene terephthalate (PBT), polybutylene naphthalate (PBN) or an equivalent thereof, but aspects of the present disclosure are not limited thereto.

In the secondary battery 100 according to one or more embodiments, the second exterior case portion 122 of the laminate exterior case 120 may include a plurality of extending regions 125, 126, and 127 extending away from the first exterior case portion 121, and a planar region 128 connected to the plurality of extending regions 125, 126, and 127 and substantially parallel with the first exterior case portion 121. Here, the plurality of extending regions 125, 126, and 127 and the planar region 128 may define the recess 123 accommodating the electrode assembly 110.

The adhesives 130 may be dispensed to, for example, the first long side region 110a, the second long side region 110b, or the first and second long side regions 110a and 110b of the electrode assembly 110 in a dot array configuration. In some examples, the adhesives 130 may be dispensed to the outermost portion of the electrode assembly 110 in a substantially matrix configuration having rows and columns (e.g., a regular quadrilateral shape or a zigzag shape).

An area of the adhesives 130 dispensed in the dot array or matrix configuration may be, for example, approximately 30% to 90% of an area of the first long side region 110a. In an embodiment, an area occupied by outermost edges of the adhesives 130 dispensed in the dot array configuration may be, for example, approximately 40%, to 90% of an area of the first long side region 110a. If the area of the dispensed adhesives 130 is less than 30%, the adhesion strength between the electrode assembly 110 and the laminate exterior case 120 may be reduced. If the area of the dispensed adhesives 130 is greater than 90%, there may be no electrolyte discharge passage available while compressing the electrode assembly 110 and the laminate exterior case 120, causing an electrolyte solution to be trapped into spaces between the adhesives 130.

In addition, the adhesives 130 dispensed in the dot array configuration may have a thickness in the range of, for example, approximately 1 µm to approximately 50 µm. If the thickness of the adhesives 130 is less than approximately 1 µm, the adhesion strength between the electrode assembly 110 and the laminate exterior case 120 may be reduced. If the thickness of the adhesives 130 is greater than approximately 50 µm, the secondary battery 100 may become unnecessarily thick.

In an embodiment, the adhesives 130 dispensed in the dot array may include any one polymer selected from the group consisting of cellulose, polyvinylidenefluoride-cohexafluoropropylene, polyvinylidene fluoridecotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose and polypropylene-maleic acid anhydride, or a mixture of two or more of these polymers. For example, polybutylacrylate and polyacrylonitrile may be polar adhesives, and polypropylene-maleic acid anhydride may be a non-polar adhesive.

Figure 2A:
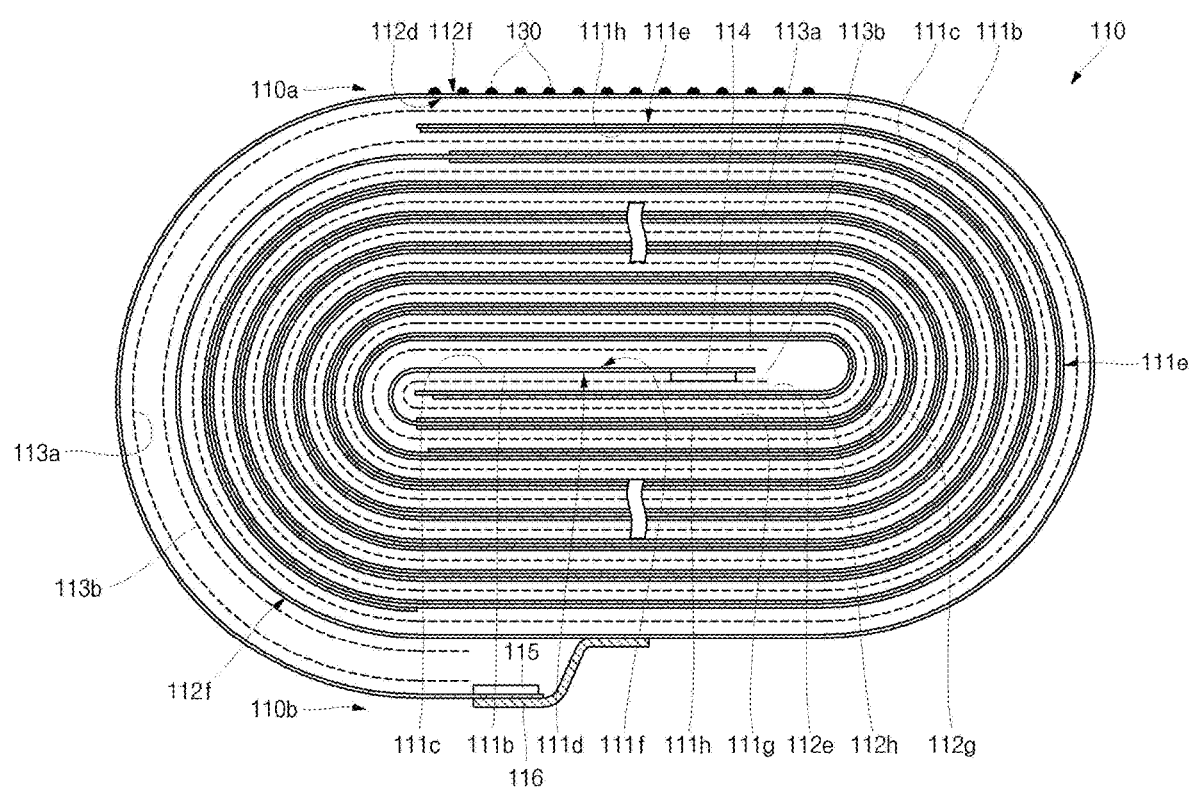
FIGS. 2A to 2C are views illustrating an electrode assembly of a secondary battery according to one or more embodiments of the present disclosure.
Figure 2B:
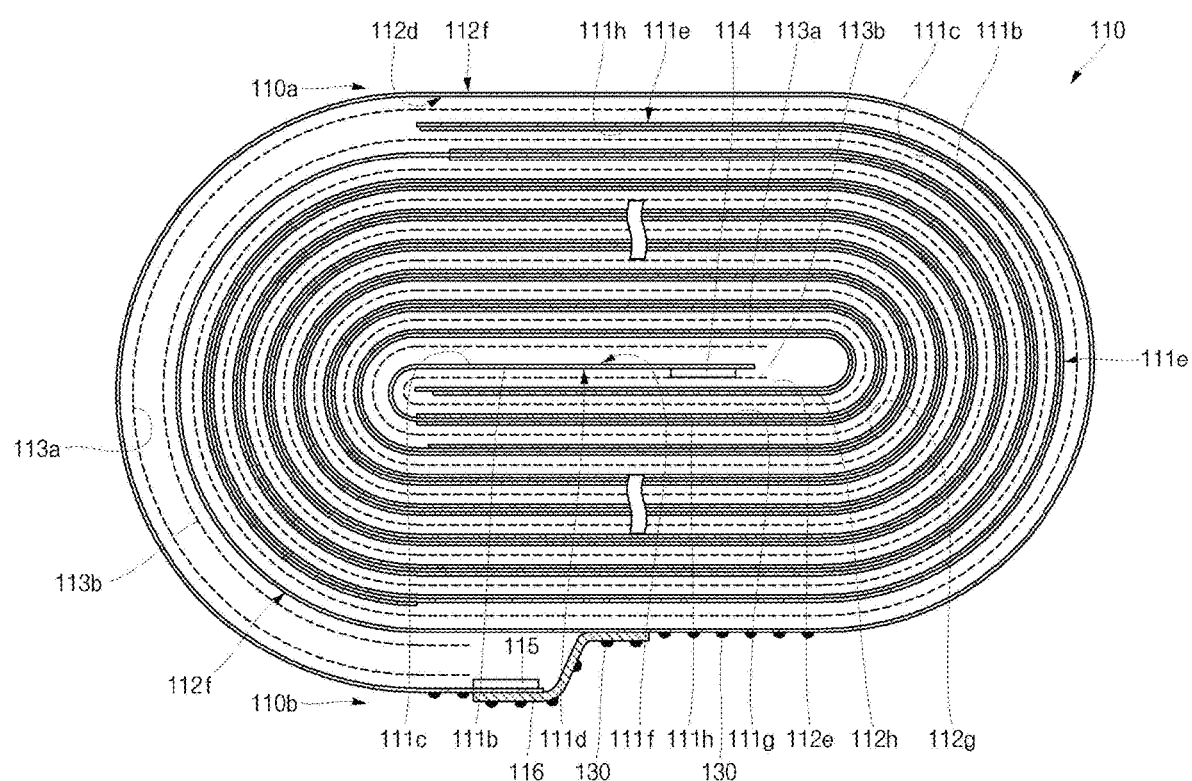
Figure 2C:
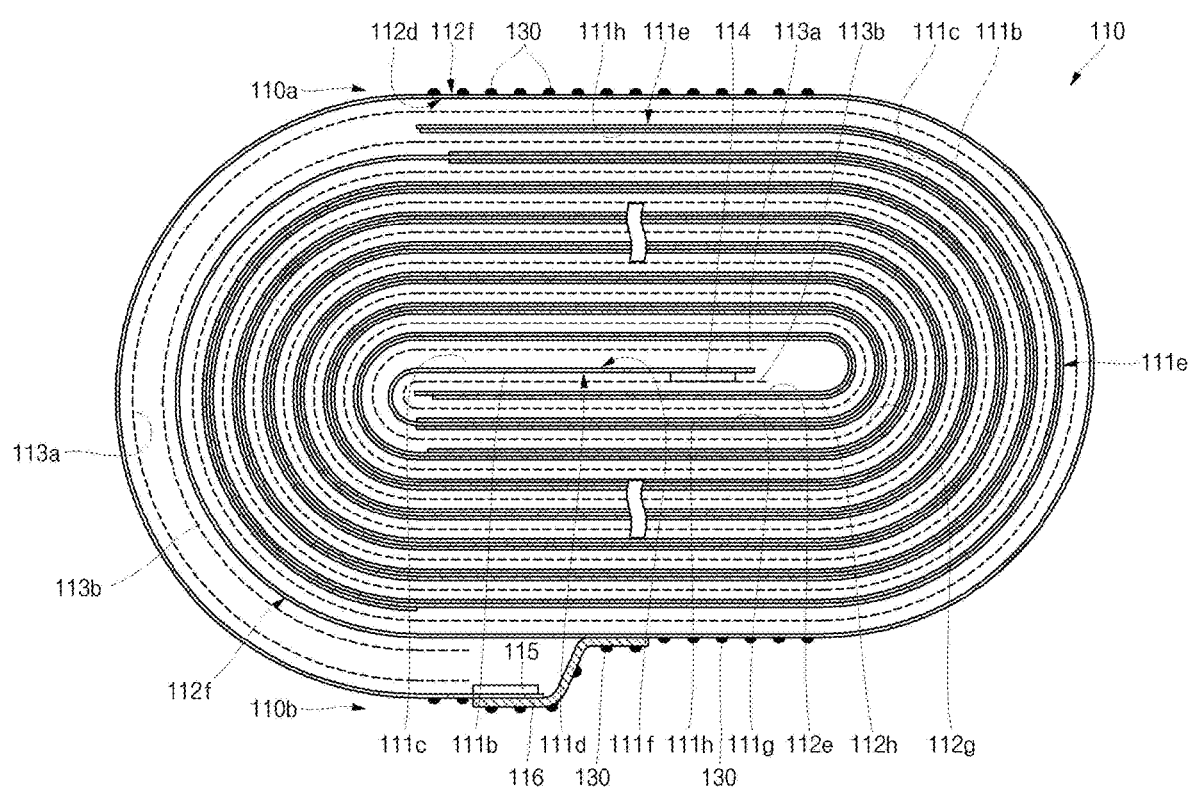
Figure 2D:
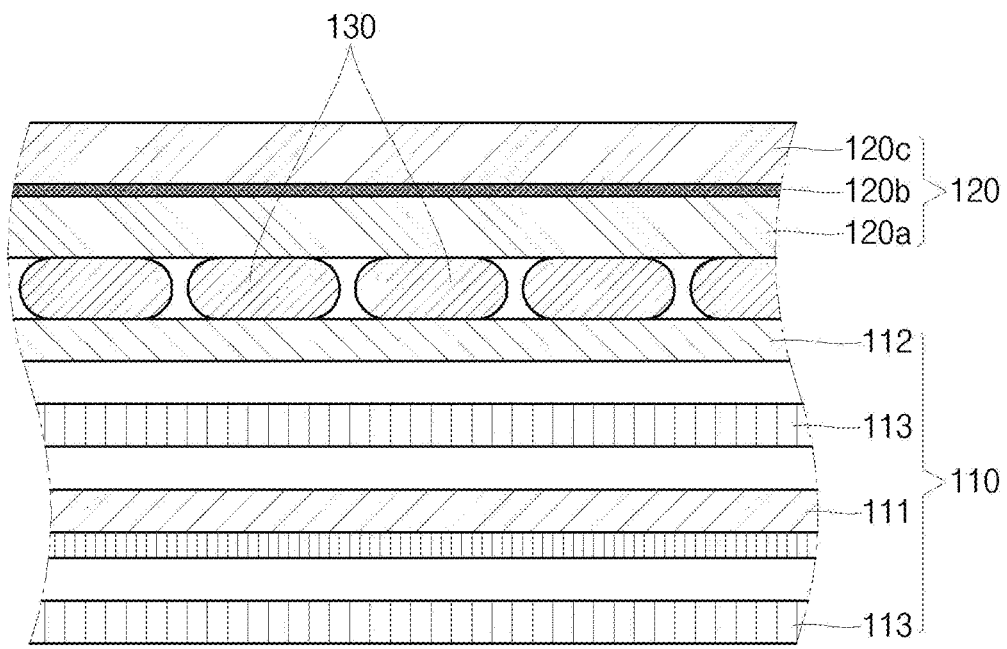
FIG. 2D is a partial cross-sectional view illustrating a state in which an uncoated portion of the electrode assembly and a laminate exterior case are adhered to each other using adhesives.

The adhesives 130 dispensed in the dot array configuration may be formed on the outermost surface of the electrode assembly 110 by, for example, a piezoelectric jetting process, but aspects of the present disclosure are not limited thereto:

FIGS. 2A to 2C are views illustrating an electrode assembly 110 of the secondary battery according to one or more embodiments of the present disclosure; and FIG. 2D is a cross-sectional view illustrating a state in which an uncoated portion of the electrode assembly 110 and a laminate exterior case are adhered to each other using adhesives. For a better understanding of the present disclosure, it is noted that the electrode assembly 110 that is loosely wound is illustrated. In some examples, in actual cases, there are few empty spaces in the interior region of the electrode assembly 110 of the secondary battery.

First, as illustrated in FIGS. 2A to 2C, in the secondary battery according to one or more embodiments of the present disclosure, the electrode assembly 110 may include, for, example, a negative electrode plate 111 having a negative electrode tab 114 formed at a front end of winding, a pair of separators 113a and 113b covering the negative electrode plate 111, and a positive electrode plate 112 having a positive electrode tab 115 formed at a terminal end of winding, but aspects of the present disclosure are not limited thereto.

Here, the front end of winding means a winding start region during a winding process of the electrode assembly 110, and the terminal end of winding means a winding end region during the winding process of the electrode assembly 110. Therefore, the negative electrode tab 114 formed at the front end of winding may be positioned on a roughly inner circumference (or an internal center) of the wound electrode assembly 110, and the positive electrode tab 115 formed at the terminal end of winding may be positioned on the inner circumference or the outer circumference (i.e., an internal surface or an outer surface) of the wound electrode assembly 110.

The negative electrode plate 111 may include a negative electrode collector plate 111a, a negative electrode-first active material layer 111g, a negative electrode-second active material layer 111h, and the negative electrode tab 114. The negative electrode collector plate 111a may include a substantially planar negative electrode-first surface 111b and a substantially planar negative electrode-second surface 111c opposite to the negative electrode-first surface 111b. In addition, the negative electrode-first active material layer 111g is coated on the negative electrode-first surface 111b of the negative electrode collector plate 111a, and the negative electrode-second active material layer 111h is coated on the negative electrode-second surface 111c of the negative electrode collector plate 111a.

In an embodiment, a negative electrode-first uncoated portion 111d (corresponding to approximately one turn from one end), where the negative electrode-first active material layer 111g is not coated, may be provided on the front end of winding of the negative electrode-first surface 111b, a negative electrode-second uncoated portion 111e (corresponding to approximately two turns from the other end), where the negative electrode-first active material layer 111g is not coated, may be provided on the terminal end of winding of the negative electrode-first surface 111b, and a negative electrode-third uncoated portion 111f (corresponding to approximately one turn from one end), where the negative electrode-second active material layer 111h is not coated, may be provided on the front end of winding of the negative electrode-second surface 111c. In an embodiment, the negative electrode uncoated portion may not be provided on the terminal end of winding of the negative electrode-second surface 111c.

The negative electrode tab 114 may be fixed to the negative electrode-first uncoated portion 111d or the negative electrode-second uncoated portion 111e of the negative electrode plate 111 by, for example, ultrasonic welding, laser welding, or resistance welding, but aspects of the present disclosure are not limited thereto.

The pair of separators 113a and 113b may cover the negative electrode-first uncoated portion 111d, the negative electrode-second uncoated portion 111e, the negative electrode-third uncoated portion 111f, the negative electrode-first active material layer 111g, and the negative electrode-second active material layer 111h of the negative electrode plate 111, and the length and width of the pair of separators 113a and 113b may be substantially equal to or greater than those of the negative electrode plate 111.

The positive electrode plate 112 may include a positive electrode collector plate 112a, a positive electrode-first active material layer 112g, a positive electrode-second active material layer 112h, and the positive electrode tab 115. The positive electrode collector plate 112a may include a substantially planar positive electrode-first surface 112b and a substantially planar positive electrode-second surface 112c opposite to the positive electrode-first surface 112b. In an embodiment, the positive electrode-first active material layer 112g is coated on the positive electrode-first surface 112b of the positive electrode collector plate 112a, and the positive electrode-second active material layer 112h is coated on the positive electrode-second surface 112c of the positive electrode collector plate 112a.

In an embodiment, a positive electrode-first uncoated portion 112d (corresponding to approximately two turns from one end), where the positive electrode-first active material layer 112g is not coated, may be provided on the terminal end of winding of the positive electrode-first surface 112b, a positive electrode-second uncoated portion 112e (corresponding to approximately two turns from the other end), where the positive electrode-first active material layer 112g is not coated, may be provided on the front end of winding of the positive electrode-first surface 112b, and a positive electrode-third uncoated portion 112f (corresponding to approximately two turns from one end), where the positive electrode-second active material layer 112h is not coated, may be provided on the terminal end of winding of the positive electrode-second surface 112c. In an embodiment, the positive electrode uncoated portion may not be provided on the front end of winding of the positive electrode-second surface 112c.

The positive electrode tab 115 may be fixed to the positive electrode-first uncoated portion 112d or the positive electrode-third uncoated portion 112f of the positive electrode plate 112 by, for example, ultrasonic welding, laser welding, or resistance welding, but aspects of the present disclosure are not limited thereto.

In an embodiment, as illustrated in FIG. 2A, adhesives 130 may be dispensed to a surface of the positive electrode-third uncoated portion 112f corresponding to the terminal end of winding of the electrode assembly 110, that is, the first long side region 110a, in a dot array configuration.

In an embodiment, as illustrated in FIG. 2B, the adhesives 130 may be dispensed to the positive electrode-third uncoated portion 112f of the electrode assembly 110 and a surface of a sealing tape 116 for finishing the positive electrode-third uncoated portion 112f, that is, the second long side region 110b, in the dot array configuration.

In an embodiment, as illustrated in FIG. 2C, the adhesives 130 may be dispensed to the positive electrode-third uncoated portion 112f of the electrode assembly 110 and the positive electrode-third uncoated portion 112f including the sealing tape 116, that is, the first long side region 110a and the second long side region 110b, in the dot array configuration.

Additionally, as illustrated in FIG. 2D, the adhesives 130 allow the positive electrode plate 112 of the electrode assembly 110 (e.g., the positive electrode-first uncoated portion 112d and/or the positive electrode-third uncoated portion 112f) and the laminate exterior case 120 (e.g., the insulation layer 120a) to be adhered to each other. In an exemplary embodiment, the adhesives 130 are polar adhesives to adhere a polar metal layer of the electrode assembly 110 to the insulation layer of the laminate exterior case 120. In some examples, the polar adhesives are adhered well to a polar material to be adhered.

Figure 3A:
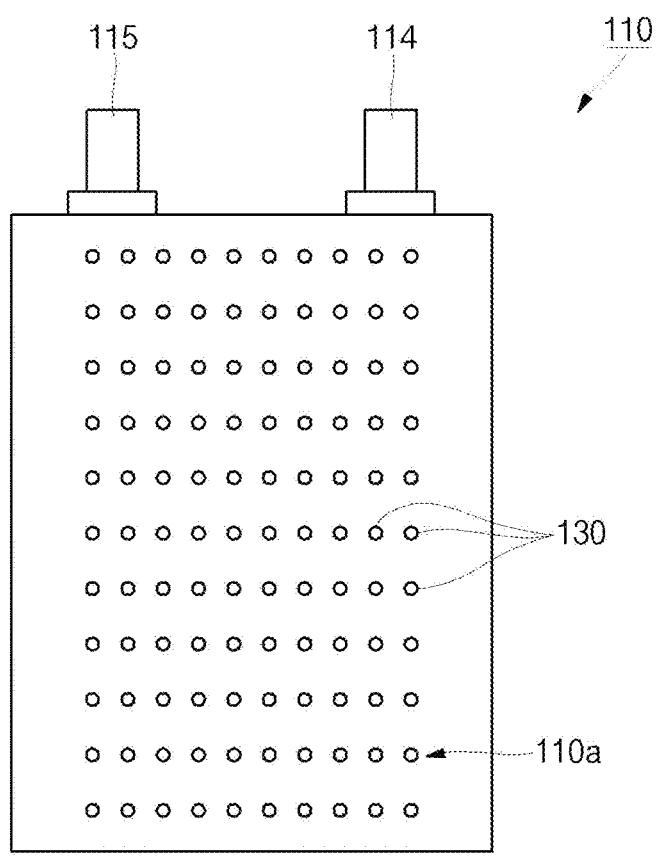
FIGS. 3A and 3B are a plan view and a bottom view, respectively, illustrating an electrode assembly in a secondary battery according to one or more embodiments of the present disclosure.
Figure 3B:
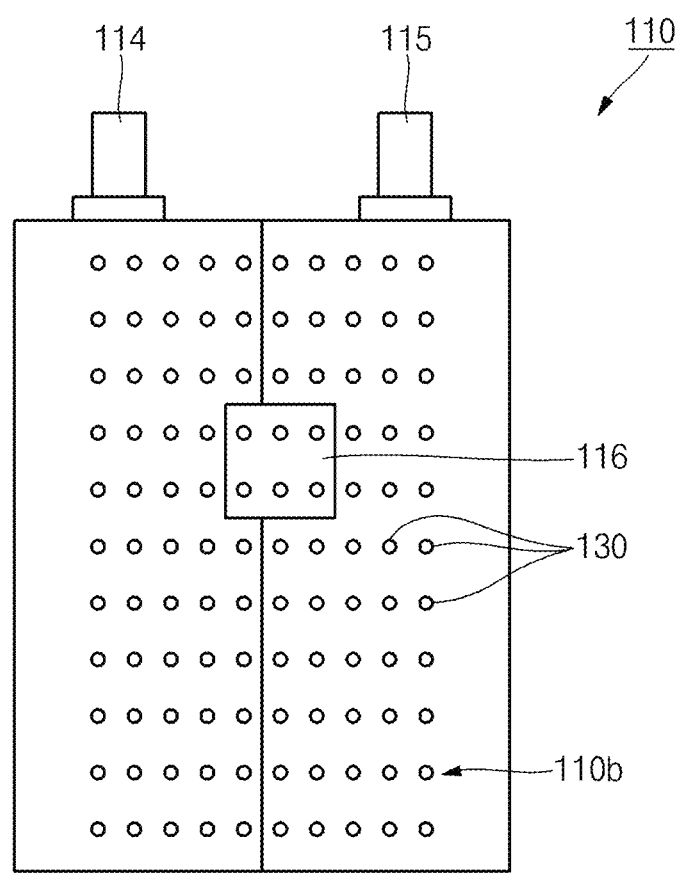

FIGS. 3A and 3B are a plan view and a bottom view, respectively, illustrating the electrode assembly 110 in the secondary battery according to one or more embodiments of the present disclosure.

As illustrated in FIGS. 3A and 3B, the adhesives 130 may be formed on the first long side region 110a, the second long side region 110b, or both of the first long side region 110a and the second long side region 110b of the electrode assembly 110 in a dot array or matrix configuration. As illustrated in FIG. 3B, if the sealing tape 116 for finishing the electrode assembly 110 is provided, the adhesives 130 may also be dispensed to a surface of the sealing tape 116 in the dot array configuration.

Figure 4:
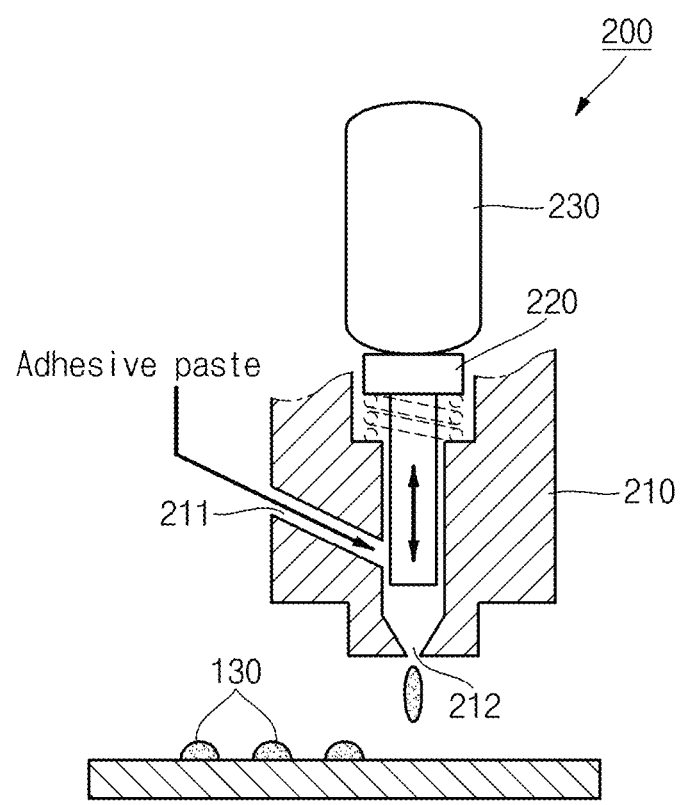
FIG. 4 illustrates an operation example of a piezoelectric jetting device for dispensing adhesives to a surface of an electrode assembly in a dot array configuration in a secondary battery according to one or more embodiments of the present disclosure.

FIG. 4 illustrates an operation example of a piezoelectric jetting device 200 for dispensing adhesives to a surface of an electrode assembly in a dot array configuration in a secondary battery according to one or more embodiments of the present disclosure.

As illustrated in FIG. 4, the piezoelectric jetting device 200 may include a body 210 having an inlet pipe 211 provided at one side for inputting the adhesives 130 or adhesive paste, a discharge pipe 212 provided at a lower side for discharging the adhesives 130, a piston 220 coupled to the body 210 to discharge a given amount of the adhesives 130 from the inlet pipe 211 to the discharge pipe 212, and a piezo element 230 coupled to a top portion of the piston 220 to reciprocally actuate the piston 220 in a top-down direction.

Unlike the general adhesive spraying device, the piezoelectric jetting device 200 can accurately dot only predefined regions with a given amount of the adhesives 130, such that a problem with the adhesives 130 contaminating other regions can be avoided. With the use of the general adhesive spraying device, small grains of sprayed adhesives or cobweb-like or threadlike adhesives may float in the air, which is problematic because of contamination of regions around the electrode assembly.

Figure 5:
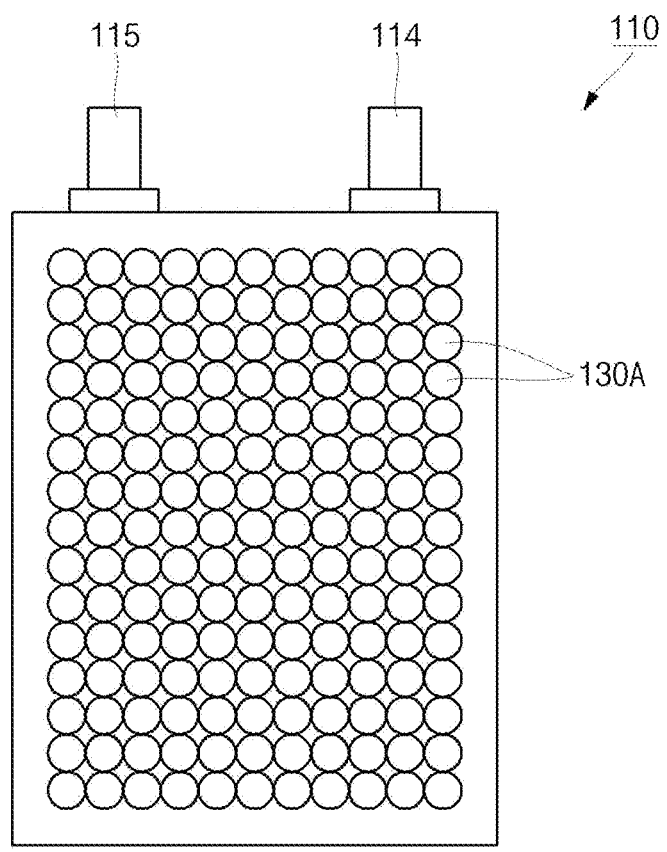
FIG. 5 illustrates an example of an adhesion region after compressing an electrode assembly and a laminate exterior case in a secondary battery according to one or more embodiments of the present disclosure.

FIG. 5 illustrates an example of an adhesion region after compressing an electrode assembly and a laminate exterior case in a secondary battery according to one or more embodiments of the present disclosure.

As illustrated in FIG. 5, in an embodiment, the adhesives 130 dispensed to the electrode assembly 110 in a dot array and/or matrix configuration are compressed under conditions of a high temperature and a high pressure after the electrode assembly 110 is accommodated in the laminate exterior case 120, and the electrode assembly 110 is adhered to the laminate exterior case through the adhesion area, which is wider than an area of the initially dispensed adhesives 130, forming adhesion regions 130A having an area (e.g., a predetermined area). Accordingly, the compressed adhesives 130 may be configured to have narrow spaces or gaps between each other or to partially overlap each other. In some examples, after the compressing, the adhesion regions 130A may be shaped of substantially deformed circles, rather than original circles, or by four deformed circles (or more than or fewer than four regions). The adhesion regions 130A allow the electrode assembly 110 and the laminate exterior case 120 to be adhered to each other.

Although the adhesion regions 130A being in contact with each other are illustrated in FIG. 5, they may be spaced by a distance (e.g., a predetermined distance) apart from each other, or only some of the adhesion regions 130A may contact each other.

Figure 6A:
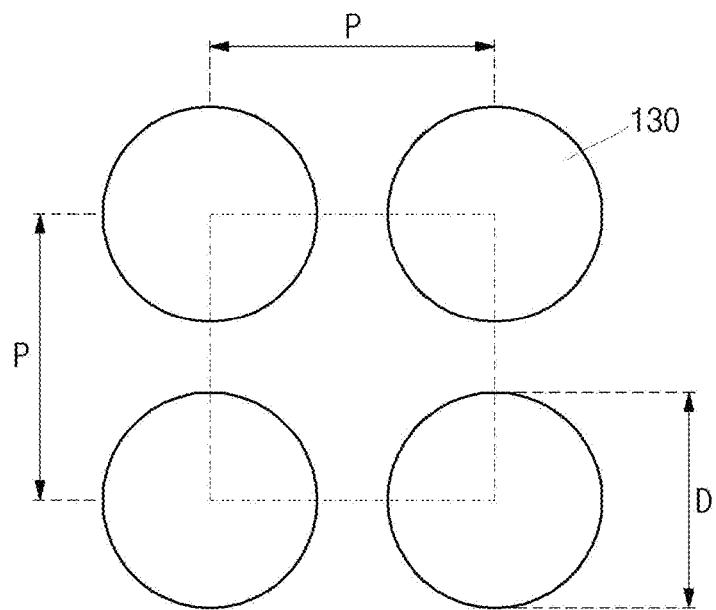
FIGS. 6A and 6B are schematic views illustrating states before and after compressing a laminate exterior case after dispensing adhesives to a surface of an electrode assembly in a dot array configuration in a secondary battery according to one or more embodiments of the present disclosure.
Figure 6B:
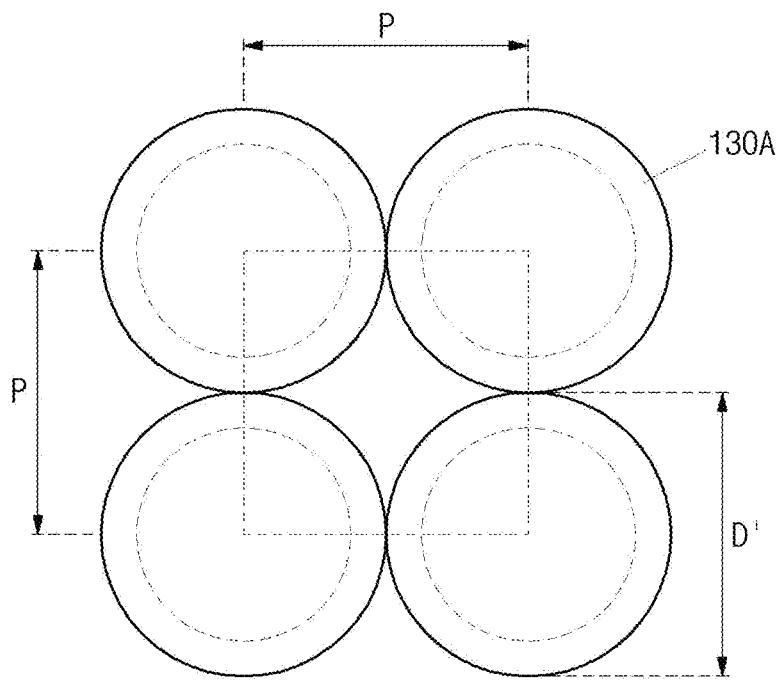

FIGS. 6A and 6B are schematic views respectively illustrating states before and after compressing a laminate exterior case after dispensing adhesives to a surface of an electrode assembly in a dot array configuration in a secondary battery according to one or more embodiments of the present disclosure. Here, the yet-to-be compressed adhesives are denoted by reference numeral 130 and the adhesion regions after the compressing are denoted by reference numeral 130A.

As illustrated in FIG. 6A, in an embodiment, before compressing the laminate exterior case and the electrode assembly, there are no overlapping regions between the adhesives dotted in substantially circular shapes, which is to prevent or substantially prevent an electrolyte solution from being trapped into the adhesion regions after the compressing. Here, a pit& P between adhesives means a horizontal or vertical distance between the adhesives, and a dot size D of an adhesive means a diameter of each, adhesive before the compressing. In an embodiment, the pitch between the adhesives dispensed in a substantially regular quadrilateral configuration and a dot array configuration may be in the range of approximately 1 mm to approximately 5 mm, and the diameter thereof may be in the range of approximately 0.8 mm to approximately 5 mm, which will be further described below.

As illustrated in FIG. 6B, after compressing the laminate exterior case and the electrode assembly to each other, the adhesives may be enlarged (e.g., shaped of circles) to have larger sizes than the initial sizes (areas or diameters), or two, three, or four regions around the adhesives may be spaced a small distance apart from each other or may contact or slightly (or completely) overlap each other (e.g., shaped of deformed circles). The adhesives having increased sizes after compressing can improve the adhesion strength between the laminate exterior case and the electrode assembly. Here, a pitch P between adhesion regions means a horizontal or vertical distance between the adhesion regions, and a size D' of an adhesion region means a diameter of each adhesion region after the compressing. As illustrated in FIGS. 6A and 6B, while there is no change in the pitch between the adhesives before and after the compressing, the dot size (area or diameter) of each adhesive (or adhesion region) is increased.

Figure 7A:
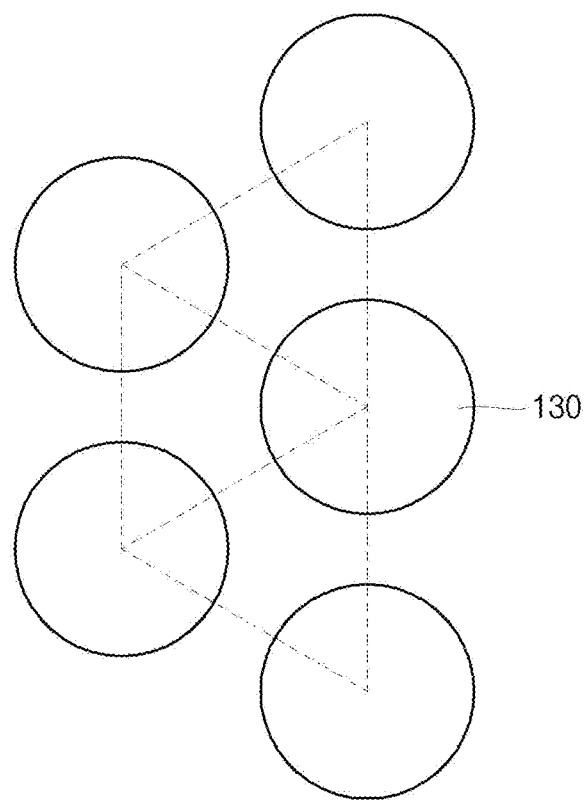
FIGS. 7A and 7B are schematic views illustrating states before and after compressing a laminate exterior case after dispensing adhesives to a surface of an electrode assembly in a zigzag dot array configuration in a secondary battery according to one or more embodiments of the present disclosure.
Figure 7B:
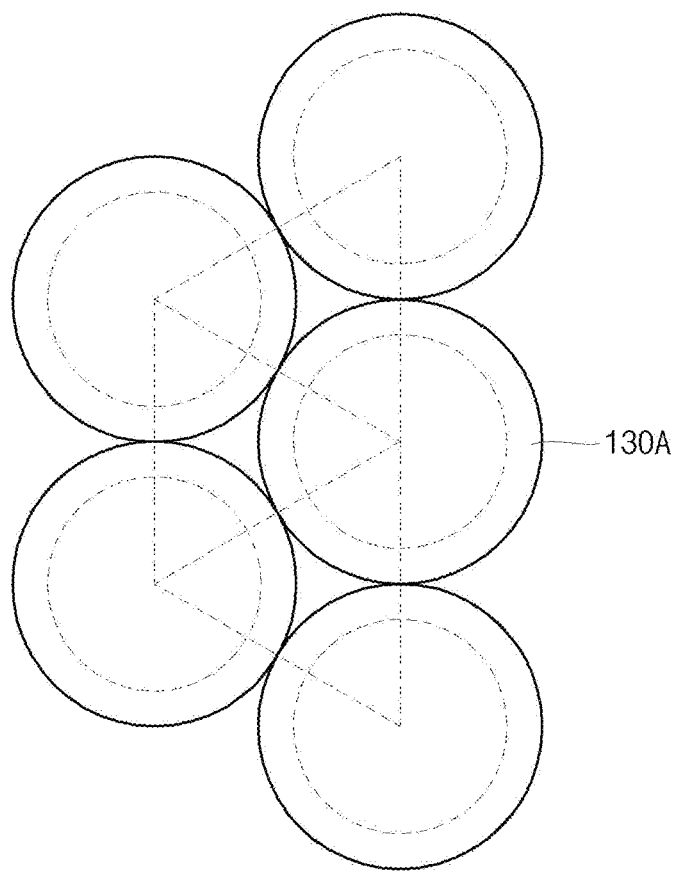

FIGS. 7A and 7B are schematic views respectively illustrating states before and after compressing the laminate exterior case after dispensing adhesives to a surface of the electrode assembly in a zigzag dot array configuration in a secondary battery according to one or more embodiments of the present disclosure.

As illustrated in FIGS. 7A and 7B, in an embodiment, the pitch between the adhesives dispensed in the zigzag dot array configuration (i.e., in the dot array configuration of a zigzag shape) in which neighboring columns cross each other may be in the range of approximately 1 mm to approximately 5 mm, and the diameter thereof may be in the range of approximately 0.8 mm to approximately 5 mm. Assuming that the same pitches are given, after the compressing, the adhesives dispensed in the zigzag dot array configuration may have an increased area, compared to the adhesives dispensed in a regular quadrilateral dot array configuration. In some examples, in a case in which the adhesives are dispensed in the dot array configuration, more dots can be formed on the same area than in a case in which the adhesives are dispensed in the regular quadrilateral configuration, suggesting that empty spaces between the adhesives after the compressing are narrowed, thereby securing an increased area. In FIGS. 6B and 7B, dotted lines indicate dot sizes of the yet-to-be compressed adhesives and solid lines indicate dot sizes of the compressed adhesives.

For comparative analysis, overlapping rates of yet-to-be compressed adhesives were tested according to dot sizes of and pitches between the adhesives, as listed in FIG. 16A. In an embodiment, the dot sizes of and the pitches between the adhesives are determined to allow an electrolyte solution to be discharged through spaces between the adhesives during compression. If the pitch between the adhesives is too large or the dot sizes of the adhesives are too small, a required level of adhesion strength between the electrode assembly and the laminate exterior case cannot be secured even though the electrolyte solution can be discharged efficiently.

In an example embodiment, the pitch between the adhesives was set to be in the range of 1 mm to 5 mm, and the dot sizes of the adhesives were set to be in the range of 0.8 mm to 5 mm. In pitch and dot size related data listed in FIG. 16A, positive numbers indicate distances between the adhesives, and negative numbers indicate overlapping distances between the adhesives. The distance or overlapping distance is a horizontal distance, a vertical distance, or a diagonal distance (that is, a distance corresponding to a length of one of four lines forming each quadrangle shown in FIG. 6A or a distance corresponding to a length of a diagonal line of each quadrangle shown in FIG. 7A).

Since no electrolyte discharge passage may be provided during compression with the dot sizes and pitches corresponding to regions where the overlapping distances are indicated as negative numbers (that is, lower left regions) in FIG. 16A, the dot sizes and pitches in the ranges stated above may not be used for the adhesives of the present disclosure.

In an embodiment, after compression, the dot sizes of the compressed adhesives are approximately 1.4 times larger than those of the yet-to-be compressed adhesives. Here, while the dot sizes vary according to compressing conditions, coating heights, or physical properties of the adhesives, the increasing rate of the dot sizes before and after compression was empirically found to be 1.4 times. FIG. 16B indicates increasing rates expressed in dot size (after compression)/pitch ratios (%). As indicated in FIG. 16B, after compression, the adhesives still have pitches in the range of approximately 1 mm to 5 mm, but equivalent diameters of the adhesives (that is, diameters of the adhesives in case the adhesives shaped of deformed circles turn into ones shaped of original circles) are in the range of approximately 1.12 mm to approximately 7 mm.

It is also empirically known that when an area of the coated adhesives (i.e., an area resulting after compression) is approximately 30% to 40% of the entire area after compression, a predetermined strength of adhesion between the electrode assembly and the laminate exterior case can be secured. Therefore, in FIG. 16B, the regions of less than 30% to 40% in area (i.e., upper right regions) indicate regions where the predetermined strength of adhesion cannot be secured even after compression. In FIG. 16B, the regions of approximately 160% in area (i.e., lower left regions) indicate regions where the adhesives inordinately overlap each other to prevent the electrolyte solution from being discharged.

Next, the sizes and pitches of the adhesives, in which electrolyte discharge passages can be secured during compression and the predetermined adhesion strength can be secured after compression, as indicated in FIGS. 16C and 16D, may be determined by collectively analyzing the data listed in FIGS. 16A and 16B. FIG. 16C indicates dot size/pitch ratios of the adhesives before compression, and FIG. 16D indicates dot size/pitch ratios of the adhesives after compression. In each of FIGS. 16C and 16D, central regions between the lower left regions and upper right regions indicate dot sizes and pitches of the adhesives which may be used according to one or more embodiments of the present disclosure.

According to various embodiments of the present disclosure, for an adhesive pitch of 1 mm, the adhesive dot size/pitch ratio is 0.8 to 1.0 when the dot sizes of the yet-to-be compressed adhesives are in the range of 0.8 mm to 1 mm. For an adhesive pitch of 1.5 mm, the adhesive dot size/pitch ratio is 0.5 to 1.0 when the dot sizes of the yet-to-be compressed adhesives are in the range of 0.8 mm to 1.5 mm. For an adhesive pitch of 2 mm, the adhesive dot size/pitch ratio is 0.6 to 1.0 when the dot sizes of the yet-to-be compressed adhesives are in the range of 1.1 mm to 2 mm. For an adhesive pitch of 2.5 mm, the adhesive dot size/pitch ratio is 0.5 to 1.0 when the dot sizes of the yet-to-be compressed adhesives are in the range of 1.3 mm to 2.5 mm. For an adhesive pitch of 3 mm, the adhesive dot size/pitch ratio is 0.5 to 1.0 when the dot sizes of the yet-to-be compressed adhesives are in the range of 1.6 mm to 3 mm. For an adhesive pitch of 3.5 mm, the adhesive dot size/pitch ratio is 0.5 to 1.0 when the dot sizes of the yet-to-be compressed adhesives are in the range of 1.8 mm to 3.5 mm. For an adhesive pitch of 4 mm, the adhesive dot size/pitch ratio is 0.5 to 1.0 when the dot sizes of the yet-to-be compressed adhesives are in the range of 2.1 mm to 0.4 mm. For an adhesive pitch of 4.5 mm, the adhesive dot size/pitch ratio is 0.5 to 1.0 when the dot sizes of the yet-to-be compressed adhesives are in the range of 2.3 mm to 4.5 mm. For an adhesive pitch of 5 mm, the adhesive dot size/pitch ratio is 0.5 to 1.0 when the dot sizes of the yet-to-be compressed adhesives are in the range of 2.6 mm to 5 mm. In some examples, when the adhesives are dispensed in the dot array configuration so as to have dot sizes and pitches in the ranges stated above, the electrolyte discharge passage is provided during compression, thereby preventing or substantially preventing the electrolyte solution from being trapped while securing a desired level of adhesion strength (peel strength) after compressing the adhesives.

According to various embodiments of the present disclosure, for an adhesive pitch of 1 mm, the adhesive dot size/pitch ratio is 1.1 to 1.4 when the dot sizes of the compressed adhesives are in the range of 1.12 mm to 1.4 mm. For an adhesive pitch of 1.5 mm, the adhesive dot size/pitch ratio is 0.7 to 1.4 when the dot sizes of the compressed adhesives are in the range of 1.12 mm to 2.1 mm. For an adhesive pitch of 2 mm, the adhesive dot size/pitch ratio is 0.8 to 1.4 when the dot sizes of the compressed adhesives are in the range of 1.54 mm to 2.8 mm. For an adhesive pitch of 2.5 mm, the adhesive dot size/pitch ratio is 0.7 to 1.4 when the dot sizes of the compressed adhesives are in the range of 1.82 mm to 3.5 mm. For an adhesive pitch of 3 mm, the adhesive dot size/pitch ratio is 0.7 to 1.4 when the dot sizes of the compressed adhesives are in the range of 2.24 mm to 4.2 mm. For an adhesive pitch of 3.5 mm, the adhesive dot size/pitch ratio is 0.7 to 1.4 when the dot sizes of the compressed adhesives are in the range of 2.52 mm to 4.9 mm. For an adhesive pitch of 4 mm, the adhesive dot size/pitch ratio is 0.7 to 1.4 when the dot sizes of the compressed adhesives are in the range of 2.94 mm to 5.6 mm. For an adhesive pitch of 4.5 mm, the adhesive dot size/pitch ratio is 0.7 to 1.4 when the dot sizes of the compressed adhesives are in the range of 3.22 mm to 6.3 mm. For an adhesive pitch of 5 mm, the adhesive dot size/pitch ratio is 0.7 to 1.4 when the dot sizes of the compressed adhesives are in the range of 3.64 mm to 7 mm.

As indicated in Table 1, according to embodiments of the present disclosure, when the adhesives are dispensed to the first long side region of the electrode assembly to a thickness of approximately 5 µm in the dot array, configuration by a piezoelectric jetting process, the measured peel strength was approximately 491 gf/25 mm. In some examples, the peel strength between the electrode assembly and the laminate exterior case was approximately 491 gf/25 mm. However, in a case of using a conventional tape, such as OPS (Oriented Polystyrene) or a hot melt, like in Comparative Examples 1 to 4, the measured peel strength was approximately 78 gf/25 mm to approximately 94 gf/25 mm. Therefore, when the adhesives are dispensed to a surface of the electrode assembly in the dot array configuration according to the embodiments of the present disclosure, the obtained peel strength was highest.

In addition, as described above, as the adhesive dot sizes and pitches are adjusted, the peel strength between the electrode assembly and the laminate exterior case varied in the range of approximately 300 gf/25 mm to approximately 2500 gf/25 mm.

The peel strength is a value measured when the electrode assembly and the laminate exterior case are separated from each other by pulling the electrode assembly and the laminate exterior case adhered to each other using the adhesives or a finishing tape in opposite directions.

TABLE 1

| | DOE No. | Area | Finishing type | Peel strength AVR |
|---|---|---|---|---|
| Tape | Comparative Example 1 | 21*80.5 (51%) | OPS 45 | 78 |
| | Comparative Example 2 | 21*80.5 (51%) | OPS 45 | 94 |
| | Comparative Example 3 | 21*80.5 (51%) | Hot Melt 35 | 94 |
| | Comparative Example 4 | 21*45 (29%) | OPS 56 | 87 |
| Piezojetting | Example | 30*70 (64%) | Adhesives (5 µm) | 491 |

Figure 8A:
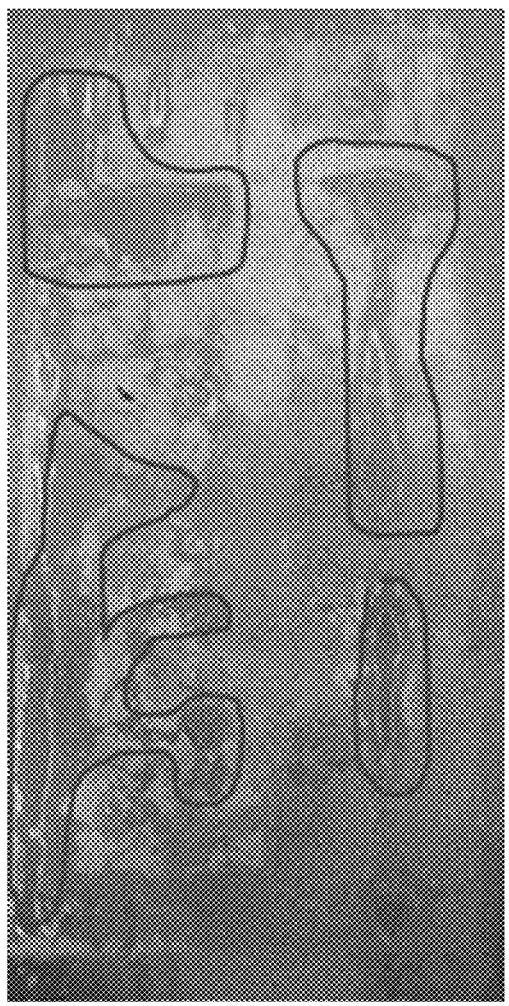
FIG. 8A is a photograph showing an electrolyte trap phenomenon after compressing a laminate exterior case in a case in which there is no electrolyte discharge passage available.
Figure 8B:
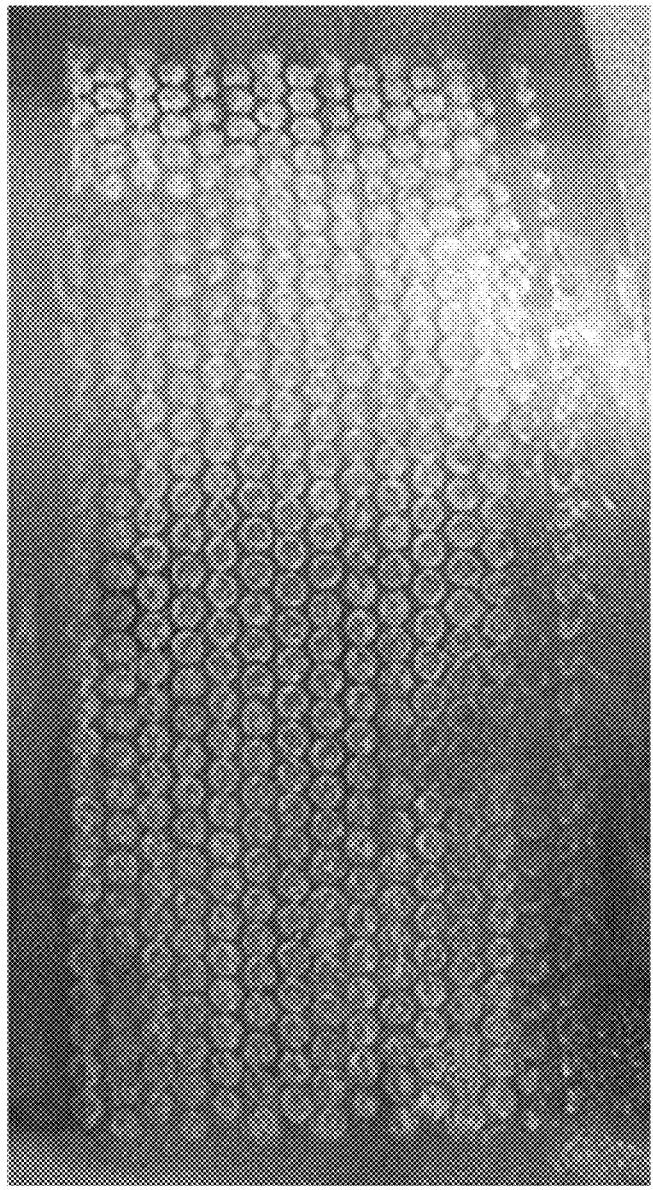
FIG. 8B is a photograph showing an electrode assembly demonstrating an improved adhesion strength by securing a sufficient adhesion area of 30% or more.

FIG. 8A is a photograph showing an electrolyte trap phenomenon after compressing a laminate exterior case in a case in which there is no electrolyte discharge passage; and FIG. 8B is a photograph showing an electrode assembly demonstrating an improved adhesion strength by securing a sufficient adhesion area of 30% or more.

As illustrated in FIG. 8A, in the case in which there is no electrolyte discharge passage before compressing the adhesives, an electrolyte trap phenomenon may occur after the compressing. In some examples, the electrolyte solution may not be discharged to the outside of adhesion regions but may be trapped in some of the adhesion regions, resulting in reduced adhesion strength (peel strength) of the adhesives (see regions indicated by closed lines).

However, as illustrated in FIG. 8B, when a dot array of the adhesives is formed and the adhesives are then compressed, dot sizes of the adhesives are appropriately increased, such that adhesives are narrowly spaced apart from each other, or two, three, or four regions of the adhesives are brought into contact with each other, thereby obtaining a desired level of adhesion strength (peel strength) of the adhesives. Here, in an embodiment, the adhesives are dispensed in a zigzag dot array configuration.

As described above, according to the embodiments of the present disclosure, the sizes of and the pitches between the adhesives dispensed to the electrode assembly in the dot array configuration or in the matrix configuration may be optimized, thereby obtaining a desired adhesion strength after compressing the adhesives while preventing or substantially preventing the electrolyte solution from being trapped into the adhesives during compression.

Figure 9A:
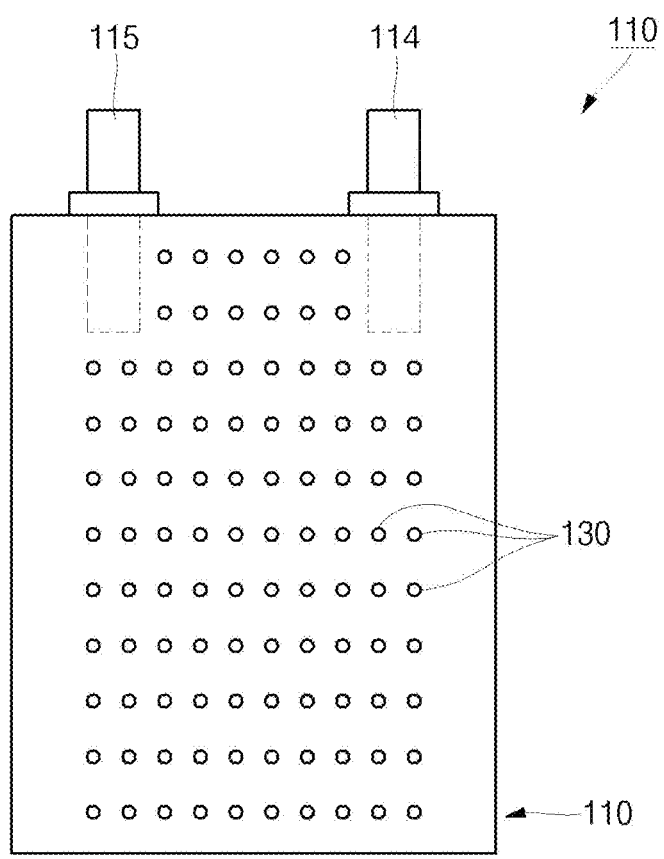
FIGS. 9A and 9B are schematic views respectively illustrating a state in which adhesives are dispensed on a surface of an electrode assembly in a dot array configuration and a state in which a laminate exterior case and the electrode assembly are thermally compressed using a thermal compression jig to improve life characteristics in a secondary battery according to one or more embodiments of the present disclosure.
Figure 9B:
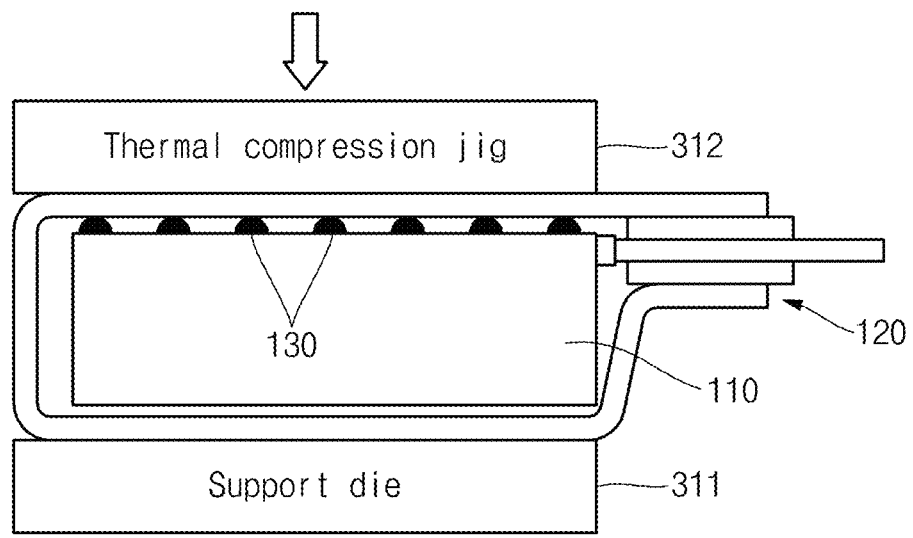

FIGS. 9A and 9B are schematic views respectively illustrating a state in which adhesives are dispensed on a surface of an electrode assembly in a dot array configuration and a state in which laminate exterior case and the electrode assembly are thermally compressed using a thermal compression jig to improve life characteristics in a secondary battery according to one or more embodiments of the present disclosure.

First, as illustrated in FIG. 9A, the adhesives 130 are formed on an area of approximately 30% to 90% relative to an area of one surface of the electrode assembly 110 to a thickness of approximately 8 µm to approximately 10 µm in a substantially dot array configuration (e.g., a regular quadrilateral shape or a zigzag shape). Here, the adhesives 130 may be formed on regions other than overlapping regions with electrode tabs 114 and 115.

Next, as illustrated in FIG. 9B, the electrode assembly 110 having the adhesives 130 and the laminate exterior case 120 are placed on a support die 311 to then be compressed using a thermal compression jig 312. Here, in an embodiment, since the adhesives 130 are formed on a surface (e.g., an entire surface) of the electrode assembly 110 in the dot array configuration, a force derived from the thermal compression jig 312 is uniformly distributed to all regions of the surface of the electrode assembly 110, rather than concentrating on local regions of the electrode assembly 110. Therefore, the electrode assembly 110, the adhesives 130, and the laminate exterior case 120 are adhered to one another by the operation of the thermal compression jig 312. Here, the local regions of the electrode assembly 110 are not deteriorated, thereby preventing or substantially preventing battery life characteristics from being lowered. In addition, even though the electrode tabs 114 and 115 may increase the thickness of the electrode assembly 110, the adhesives 130 are not formed on regions corresponding to the electrode tabs 114 and 115, such that local pressures are not applied to the regions of the electrode assembly 110 corresponding to the electrode tabs 114 and 115.

Therefore, according to various embodiments of the present disclosure, the overall area of the electrode assembly is uniformly compressed during the compression of the electrode assembly 110 and the laminate exterior case 120, such that particular regions of the electrode assembly 110 are not excessively deteriorated, thereby improving battery life characteristics, unlike in the conventional art in which only predefined regions of the electrode assembly are locally compressed by an adhesive film.

Figure 10:
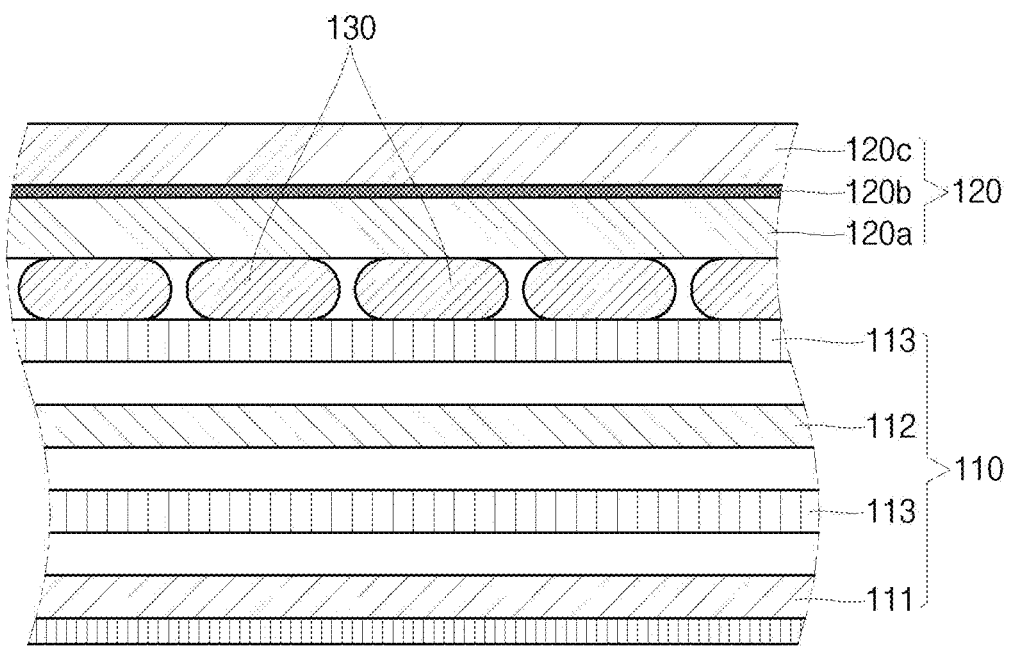
FIG. 10 is a cross-sectional view illustrating a state in which a separator of an electrode assembly and a laminate exterior case are adhered to each other using adhesives in a secondary battery according to one or more embodiments of the present disclosure.

FIG. 10 is a cross-sectional view illustrating a state in which a separator of an electrode assembly and a laminate exterior case are adhered to each other using adhesives in a secondary battery according to one or more embodiments of the present disclosure.

As illustrated in FIG. 10, when the outermost portion of the electrode assembly. 110 is finished with the separator 113, adhesives 130 may be formed on the separator 113 in a dot array configuration (e.g., a regular quadrilateral shape or a zigzag shape). In an exemplary embodiment, the adhesives 130 allowing the non-polar separator 113 and an insulation layer 120a (e.g., a CPP film) of the laminate exterior case 120 to be adhered to each other are non-polar adhesives. In some examples, the non-polar adhesives are adhered well to a non-polar material to be adhered. In another exemplary embodiment, the outermost portion of the electrode assembly 110 is finished with a metal layer (an uncoated portion), as stated above, and the adhesives 130 allowing the metal layer and the insulation layer 120a of the laminate exterior case 120 to be adhered to each other are polar adhesives.

Figure 11A:
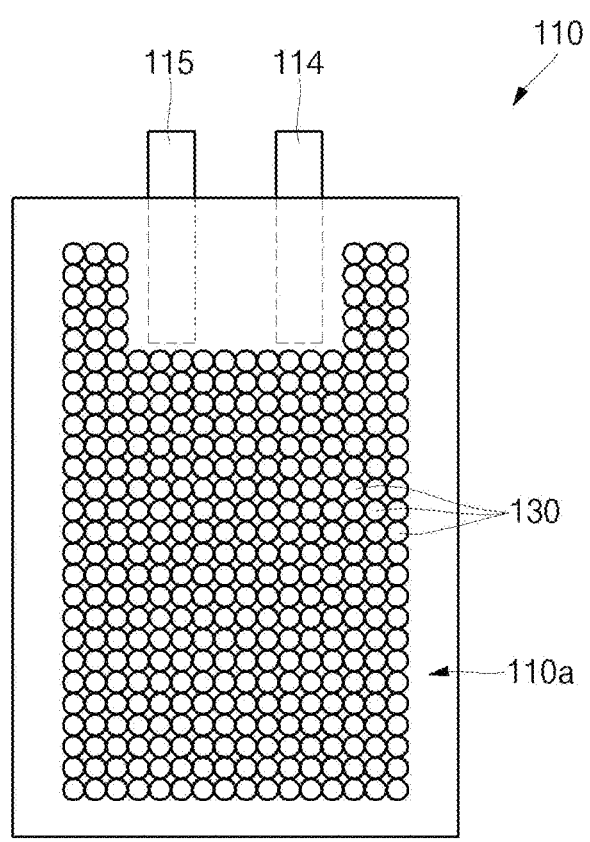
FIGS. 11A and 11B are a plan view and a bottom view, respectively, illustrating a state in which adhesives are dispensed to a surface of an electrode assembly in a dot array configuration in a secondary battery according to one or more of the present disclosure.
Figure 11B:
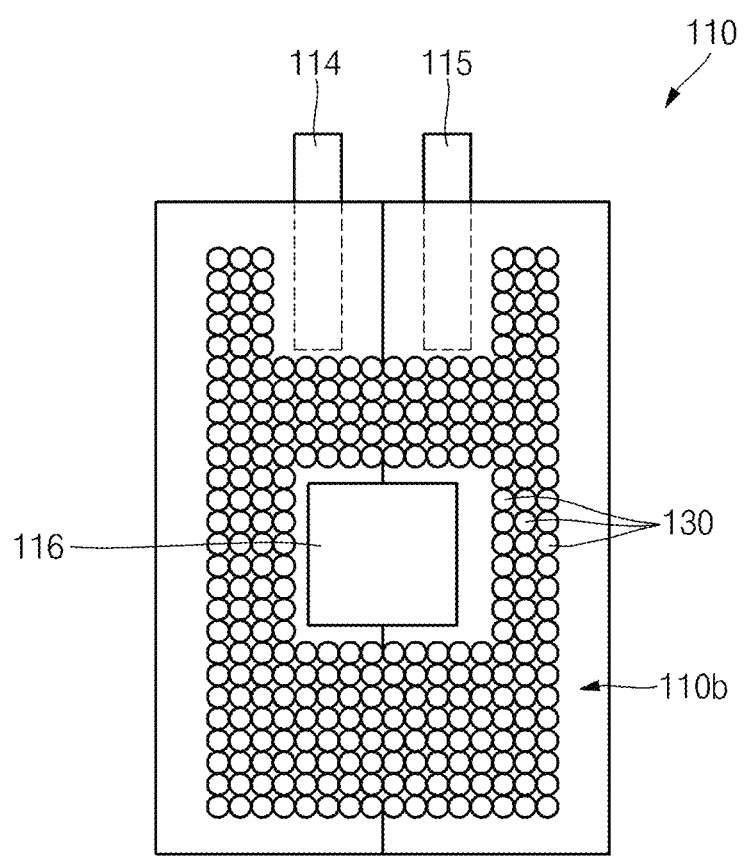

FIGS. 11A and 11B Bare a plan view and a bottom view, respectively, illustrating a state in which adhesives are dispensed to a surface of an electrode assembly in a dot array configuration in a secondary battery according to one or more embodiments of the present disclosure.

As illustrated in FIGS. 11A and 11B, the electrode assembly 110 may include a negative electrode tab 114 outwardly extending a length (e.g., a predetermined length) from a negative electrode plate, and a positive electrode tab 115 outwardly extending a length (e.g., a predetermined length) from a positive electrode plate, and adhesives 130 may be dispensed to a long side region 110a which is the outermost portion of the electrode assembly 110 (i.e., the negative electrode plate, the positive electrode plate, or the separator), except for regions corresponding to the negative electrode tab 114 and/or the positive electrode tab 115, in a dot array configuration. In addition, the electrode assembly 110 may include a finishing tape 116 for finishing the outermost portion of the electrode assembly 110, and the adhesives 130 may be dispensed to a long side region 110b which is the outermost portion of the electrode assembly 110 (i.e., the negative electrode plate, the positive electrode plate, or the separator), except for regions corresponding to the finishing tape 116, in the dot array configuration.

Figure 12A:
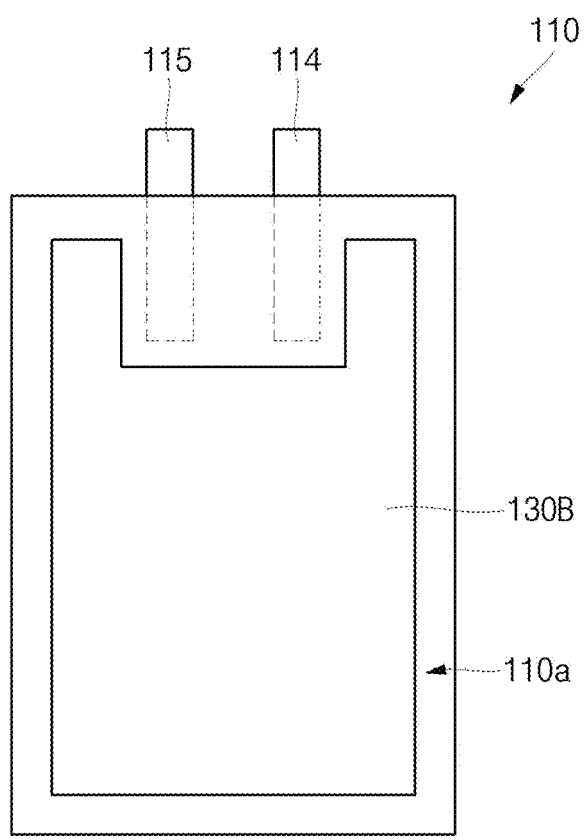
FIGS. 12A and 12B are a plan view and a bottom view, respectively, schematically illustrating areas occupied by outermost circumferences of the adhesives in FIGS. 11A and 11B.
Figure 12B:
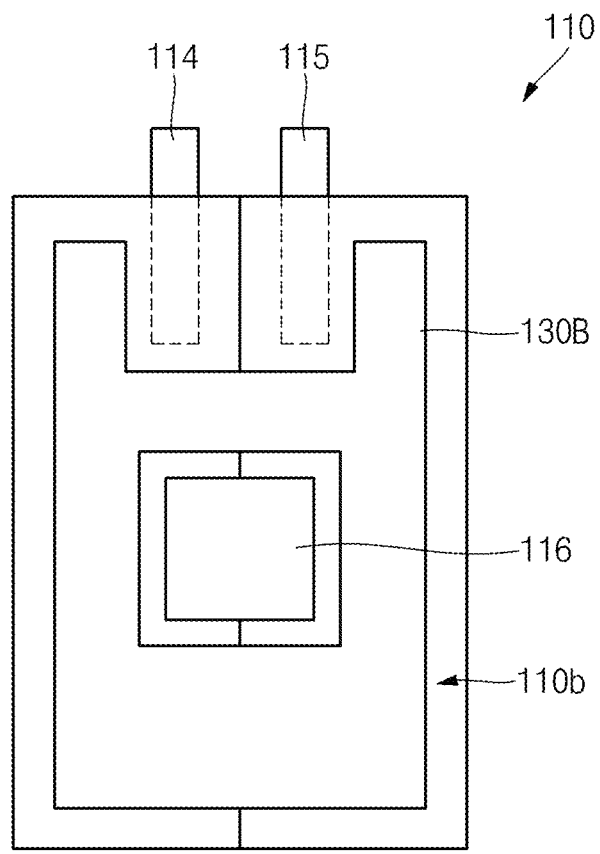

FIGS. 12A and 12B are a plan view and a bottom view, respectively, schematically illustrating areas occupied by outermost circumferences of the adhesives in FIGS. 11A and 11B.

As illustrated in FIGS. 12A and 12B, edge regions 130B of the adhesives dispensed to the electrode assembly 110 may not correspond to or overlap the negative electrode tab 114, the positive electrode tab 115, and/or the finishing tape 116. Therefore, the negative electrode tab 114, the positive electrode tab 115, and/or the finishing tape 116 may occupy a thickness (e.g., a predetermined thickness), and the adhesives 130 are not dispensed to a surface of the electrode assembly 110, which corresponds to or overlaps the negative electrode tab 114, the positive electrode tab 115, and/or the finishing tape 116, thereby preventing or substantially preventing particular regions of the electrode assembly 110 from being inordinately thick.

Therefore, when the laminate exterior case and the electrode assembly are thermally compressed using a thermal compression jig, an excess pressure may not be applied to particular regions of the electrode assembly. Instead, a uniform pressure may be applied to the entire area of the electrode assembly during compression, thereby improving life characteristics of the secondary battery.

A manufacturing method of a secondary battery according to various embodiments of the present disclosure may include providing an electrode assembly, dispensing adhesives, accommodating the electrode assembly in a pouch exterior case, and compressing.

In the providing of the electrode assembly, the electrode assembly of a winding type or a stack type may include a first electrode plate, a second electrode plate, and a separator interposed between the first electrode plate and the second electrode plate, as described above.

In the dispensing of adhesives, the adhesives may be dispensed to the outermost portion (any one of the first electrode plate, the second electrode plate, and the separator) of the electrode assembly in a dot array configuration by, for example, a piezoelectric jetting process. Here, a dot size/pitch ratio of the yet-to-be compressed adhesives the adhesives may be in a range of approximately 0.5 to approximately 1.0. If the dot size/pitch ratio is smaller than approximately 0.5, the coating area of the adhesives may be too small to obtain a desired adhesion strength. If the dot size/pitch ratio is greater than approximately 1.0, the overlapping area of the adhesives after compression may be inordinately large, causing an electrolyte solution to be trapped in spaces between the adhesives.

In the accommodating of the electrode assembly in the pouch exterior case, the electrode assembly having the adhesives dispensed thereto may be accommodated within the pouch exterior case having planar long side portions and short side portions, as described above.

In the compressing, the long side portions of the pouch exterior case, the adhesives and the electrode assembly may be compressed together. In an embodiment, the compressing may be performed using a thermal compression jig, as described above. In some examples, the pouch exterior case accommodating the electrode assembly is placed on a support die, and the electrode assembly and the pouch exterior case are compressed using the thermal compression jig, thereby allowing the dispensed and provisionally hardened adhesives to be melted. Thereafter, the adhesives are completely hardened by cooling, and the electrode assembly is firmly adhered to the pouch exterior case through the adhesives.

Figure 13A:
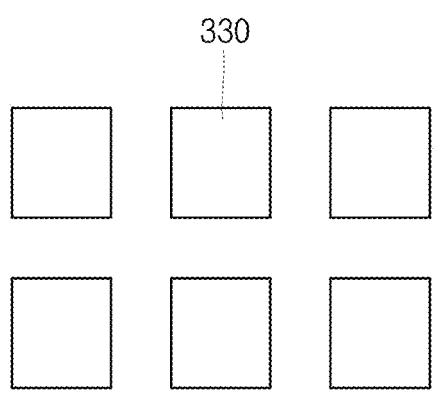
FIGS. 13A and 13B are schematic views respectively illustrating states before and after compressing a laminate exterior case after dispensing adhesives to a surface of an electrode assembly in a dot array configuration in a secondary battery according to one or more embodiments of the present disclosure.
Figure 13B:
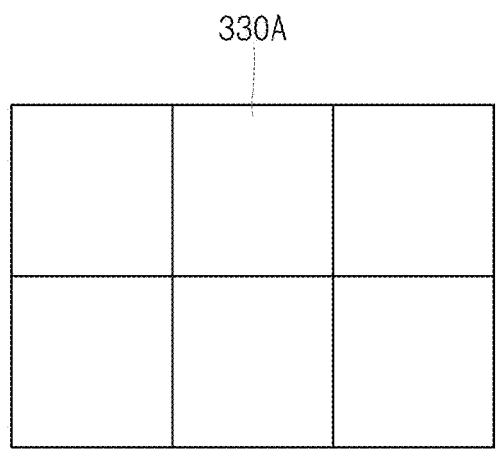

FIGS. 13A and 13B are schematic views respectively illustrating states before and after compressing a laminate exterior case after dispensing adhesives to a surface of an electrode assembly in a dot array configuration in a secondary battery according to one or more embodiments of the present disclosure.

As illustrated in FIG. 13A, before compressing the laminate exterior case and the electrode assembly, adhesives 330 dispensed in the dot array configuration may be shaped of quadrangles spaced apart from each other with empty spaces therebetween (i.e., quadrangles independent from each other). As illustrated in FIG. 13B, after compressing the laminate exterior case and the electrode assembly, adhesives 330A may be shaped of quadrangles overlapping each other without empty spaces therebetween (i.e., interconnected quadrangles). In other words, while the yet-to-be compressed adhesives 330 are spaced apart from each other with empty spaces therebetween to be shaped of small quadrangles, the compressed adhesives 330A may overlap each other to be shaped of enlarged quadrangles without empty spaces. Accordingly, after compression, it is possible to prevent or substantially prevent an electrolyte solution from being trapped into the adhesives.

Figure 14A:
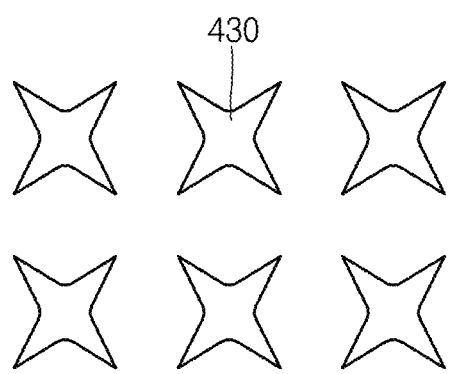
FIGS. 14A and 14B are schematic views respectively illustrating states before and after compressing a laminate exterior case after dispensing adhesives to a surface of an electrode assembly in a dot array configuration in a secondary battery according to one or more embodiments of the present disclosure.
Figure 14B:
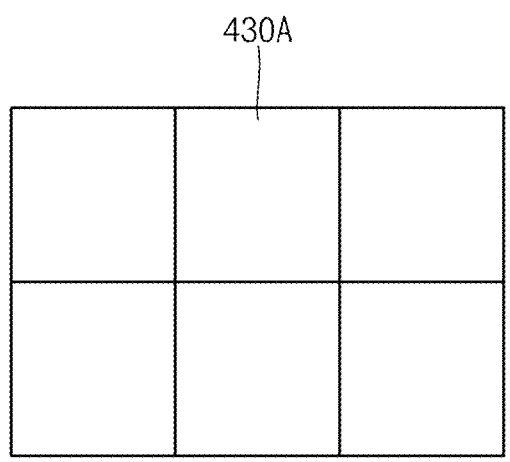

FIGS. 14A and 14B are schematic views respectively illustrating states before and after compressing a laminate exterior case after dispensing adhesives to a surface of an electrode assembly in a dot array configuration in a secondary battery according to one or more embodiments of the present disclosure.

As illustrated in FIG. 14A, before compressing the laminate exterior case and the electrode assembly, adhesives 430 dispensed in the dot array configuration may be shaped of stars spaced apart from each other with empty spaces therebetween (i.e., stars independent of each other). As illustrated in FIG. 14B, after compressing the laminate exterior case and the electrode assembly, adhesives 430A may overlap each other without empty spaces therebetween (i.e., interconnected). In other words, while the yet-to-be compressed adhesives 430 are spaced apart from each other with empty spaces therebetween to be shaped of small stars, the compressed adhesives 430A may overlap each other to be shaped of enlarged quadrangles without empty spaces. Accordingly, after compression, it is possible to prevent or substantially prevent an electrolyte solution from being trapped into, the adhesives.

Additionally, although not illustrated, before compressing the laminate exterior case and the electrode assembly, the adhesives dispensed in the dot array configuration may be shaped of triangles, pentagons, hexagons, polygons, or circles, which are spaced apart from each other with empty spaces therebetween. However, after compressing the laminate exterior case and the electrode assembly, the compressed adhesives may overlap each other to be enlarged without empty spaces therebetween.

Figure 15A:
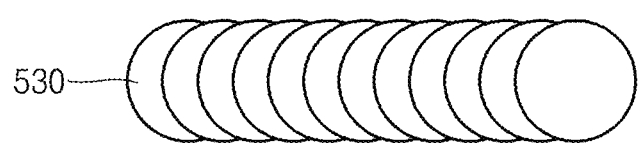
FIGS. 15A and 15B are schematic views respectively illustrating states before and after compressing a laminate exterior case after dispensing adhesives to a surface of an electrode assembly in a dot array configuration in a secondary battery according to one or more embodiments of the present disclosure.
Figure 15A:
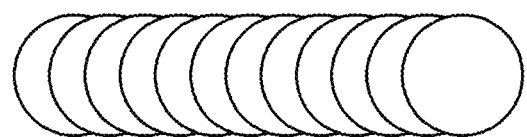
Figure 15B:
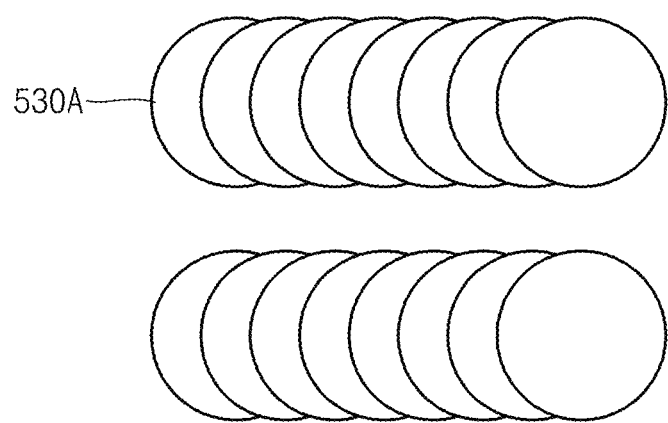

FIGS. 15A and 15B are schematic views respectively illustrating states before and after compressing a laminate exterior case after dispensing adhesives to a surface of an electrode assembly in a dot array configuration in a secondary battery according to one or more embodiments of the present disclosure.

As illustrated in FIG. 15A, before compressing the laminate exterior case and the electrode assembly, adhesives 530 dispensed in the dot array configuration may overlap each other to form a line. Here, the line may include multiple lines. In addition, the respective lines may be spaced apart from each other. As illustrated in FIG. 15B, after compressing the laminate exterior case and the electrode assembly, adhesives 530A may be shaped of lines having relatively large widths. Here, the respective lines may be spaced apart from each other or may overlap each other.

Here, the adhesives may be shaped of triangles, quadrangles, pentagons, hexagons, or stars, which are narrowly spaced apart from each other to overlap each other. On the basis of one line, line-shaped adhesives may be coated in an increased amount, compared to dot-shaped adhesives, thereby improving adhesion strength between the laminate exterior case and the electrode assembly. In addition, since an electrolyte discharge passage is formed by a distance between the respective lines, it is possible to prevent occurrence of an electrolyte trap phenomenon.

While a secondary battery of the present disclosure and a manufacturing method thereof have been particularly shown and described with reference to some exemplary embodiments thereof, it will be understood by those of ordinary skill in the art that various changes in form and details may be made therein without departing from the spirit and scope of the present disclosure as set forth by the following claims.

What is claimed is:

1. A secondary battery comprising:
   an electrode assembly comprising a first electrode plate, a second electrode plate, and a separator between the first electrode plate and the second electrode plate;
   a pouch exterior case comprising a planar long side region and a short side region to surround the electrode assembly; and
   adhesives in a dot array configuration at an outermost portion of the electrode assembly facing the planar long side region of the pouch exterior case,
   wherein a dot size to pitch ratio of the adhesives in the dot array configuration is in a range from 0.7 to 1.4.

2. The secondary battery of claim 1, wherein the first electrode plate or the second electrode plate of the electrode assembly faces the planar long side region of the pouch exterior case, and a first uncoated portion or a second uncoated portion of the first electrode plate or the second electrode plate faces the planar long side region of the pouch exterior case.

3. The secondary battery of claim 2, wherein the adhesives comprise polar adhesives.

4. The secondary battery of claim 1, wherein the separator of the electrode assembly faces the planar long side region of the pouch exterior case, and the adhesives comprise non-polar adhesives.

5. The secondary battery of claim 1, wherein the adhesives in the dot array configuration comprise adhesives in a regular quadrilateral shape or in a zigzag shape in which neighboring columns cross each other.

6. The secondary battery of claim 5, wherein the adhesives in the dot array configuration overlap each other.

7. The secondary battery of claim 1, wherein the adhesives in the dot array configuration overlap each other to form a line, and the line comprises multiple lines.

8. The secondary battery of claim 1, wherein an area of the adhesives is 30% to 90% of an area of one surface of the electrode assembly.

9. The secondary battery of claim 1, wherein an area of the adhesives is greater than 40% of an area occupied by an outermost periphery of the adhesives.

10. The secondary battery of claim 1, wherein the adhesives have a thickness in a range of 1 μm to 50 μm.

11. The secondary battery of claim 1, wherein the adhesives have a peel strength in a range of 300 gf/25 mm to 2500 gf/25 mm.

12. The secondary battery of claim 1, wherein the adhesives have a pitch in a range of 1 mm to 5 mm and an equivalent diameter in a range of 1.1 mm to 7 mm.

13. The secondary battery of claim 1, wherein the adhesives include any one polymer selected from the group consisting of cellulose, polyvinylidenefluoride-cohexafluoropropylene, polyvinylidene fluoridecotrichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose and polypropylene-maleic acid anhydride, or a mixture of two or more polymers of said group.

14. The secondary battery of claim 1, wherein the adhesives are shaped of deformed circles or deformed by overlapping portions thereof in contact with each other.

15. The secondary battery of claim 1, wherein the electrode assembly comprises a first long side region and a second long side region at opposite regions spaced apart from each other, and short side regions at opposite regions spaced apart from each other and connecting the first and second long side regions, and the adhesives are on any one of the first long side region and the second long side region or on both of the first long side region and the second long side region.

16. The secondary battery of claim 15, wherein the electrode assembly further comprises a finishing tape attached to the second long side region, and the adhesives in the dot array configuration are on the finishing tape and the second long side region positioned at an exterior side of the finishing tape.

17. The secondary battery of claim 1, wherein the electrode assembly further comprises a first electrode tab extending from the first electrode plate to the outside and a second electrode tab extending from the second electrode plate to the outside, and the adhesives are at the outermost portion of the electrode assembly, excluding regions corresponding to the first and second electrode tabs.

18. The secondary battery of claim 1, wherein the electrode assembly further comprises a finishing tape for finishing the outermost portion of the electrode assembly, and the adhesives are at the outermost portion of the electrode assembly, excluding a region corresponding to the finishing tape.

19. A manufacturing method of a secondary battery, the manufacturing method comprising:
   providing an electrode assembly comprising a first electrode plate, a second electrode plate, and a separator between the first electrode plate and the second electrode plate;
   dispensing adhesives to an outermost portion of the electrode assembly in a dot array configuration;
   accommodating the electrode assembly having the adhesives dispensed thereto in a pouch exterior case comprising planar long side regions and short side regions to surround the electrode assembly, wherein the outermost portion of the electrode assembly having the adhesives dispensed thereto faces at least one of the planar long side regions; and
   compressing the planar long side regions of the pouch exterior case, the adhesives, and the electrode assembly, such that a dot size to pitch ratio of the adhesives in the dot array configuration is in a range from 0.7 to 1.4,
   wherein before compressing the planar long side regions of the pouch exterior case, the adhesives, and the electrode assembly, a dot size to pitch ratio of the adhesives is in a range from 0.5 to 1.0.

20. The manufacturing method of claim 19, wherein the adhesives are formed by a piezoelectric jetting process.

21. The manufacturing method of claim 19, wherein, before the compressing, the adhesives have a pitch in a range of 1 mm to 5 mm and a diameter in a range of 0.8 mm to 5 mm, and wherein, after the compressing, the adhesives have a pitch in a range of 1 mm to 5 mm and an equivalent diameter in a range of 1.1 mm to 7 mm.

22. The manufacturing method of claim 19, wherein, before the compressing, the adhesives in the dot array configuration are shaped of triangles, quadrangles, pentagons, hexagons, polygons, circles, or stars, which are spaced apart from each other with empty spaces therebetween, and, after the compressing, the adhesives in the dot array configuration overlap each other.

* * * * *